United States Patent
Gillett

(10) Patent No.: US 12,420,156 B1
(45) Date of Patent: Sep. 23, 2025

(54) SYSTEM AND METHOD FOR ASSEMBLING AND PLAYING MODULAR MINIATURE GOLF GAMES WITH REMOTE PARTICIPANTS

(71) Applicant: James B. Gillett, Manchester, NH (US)

(72) Inventor: James B. Gillett, Manchester, NH (US)

( * ) Notice: Subject to any disclaimer, the term of this patent is extended or adjusted under 35 U.S.C. 154(b) by 665 days.

(21) Appl. No.: 17/574,049

(22) Filed: Jan. 12, 2022

Related U.S. Application Data

(60) Provisional application No. 63/136,711, filed on Jan. 13, 2021.

(51) Int. Cl.
| | | |
|---|---|---|
| *A63B 67/02* | (2006.01) | |
| *A63B 71/06* | (2006.01) | |
| *G06F 30/12* | (2020.01) | |
| *G06F 30/20* | (2020.01) | |
| *G06F 111/02* | (2020.01) | |
| *G06F 111/16* | (2020.01) | |
| *G06F 111/20* | (2020.01) | |

(52) U.S. Cl.
CPC .......... *A63B 67/02* (2013.01); *A63B 71/0622* (2013.01); *A63B 71/0669* (2013.01); *G06F 30/12* (2020.01); *G06F 30/20* (2020.01); *G06F 2111/02* (2020.01); *G06F 2111/16* (2020.01); *G06F 2111/20* (2020.01)

(58) Field of Classification Search
CPC . A63B 67/02; A63B 71/0622; A63B 71/0669; G06F 30/12; G06F 30/20; G06F 2111/02; G06F 2111/16; G06F 2111/20
See application file for complete search history.

(56) References Cited

U.S. PATENT DOCUMENTS

| | | | |
|---|---|---|---|
| 2,827,299 A | 3/1958 | Dean | |
| 4,098,507 A | 7/1978 | Hudon | |
| 5,366,224 A | 11/1994 | Stanwyck | |
| 5,516,109 A | 5/1996 | Desjardins | |
| 2002/0169027 A1* | 11/2002 | Fowler | A63B 67/02 473/157 |

FOREIGN PATENT DOCUMENTS

GB 358362 A 10/1931

OTHER PUBLICATIONS

4 Fun Cosmic Mini Golf: https://www.amazon.com/Fun-Cosmic-Mini-Golf-Deluxe/dp/B07VX9VLGT/ref=psdc_166457011_t1_B01M3YQ7SY, Oct. 23, 2019.
Noochie Golf: https://www.amazon.com/dp/B01M3YQ7SY/ref=sspa_dk_detail_7?psc=1&pd_rd_i=B01M3YQ7SY&pd_rd_w=wTrA9&pf_rd_p=48d372c1-f7e1-4b8b-9d02-4bd86f5158c5&pd_rd_wg=koBNm&pf_rd_r=W2XKTNR3PNKWTY12PM3B&pd_rd_r=e1bd8b03-dfa6-4079-a9f4-4b3078ef8aad&spLa=ZW5jcnlwdGVkUXVhbGlmaWVyPUEyUUZJMUc0R1cxRzl3JmVuY3J5cHRlZEIK
PUEwNzc1NDAyMzNHVEJIMUJDNjhWWWViZIbmNyeXBBOZ
WRBZEIkPUEwNzl2OTEyMIIVNIgzNUtOUOJSOCZ3aWRnZX
ROYW1IPXNwX2RldGFpbCZhY3Rpb249Y2xpY2tSZWRpcmVj
dCZkb05vdExvZONsaWNrPXRydWU=, Nov. 3, 2016.

* cited by examiner

*Primary Examiner* — Kevin Y Kim
(74) *Attorney, Agent, or Firm* — Loginov & Associates, PLLC; William A. Loginov

(57) ABSTRACT

A modular miniature golf game can include a kit with various physical components, including module tiles, optional obstacles and other features, and sidewalls. A player can construct a large number of different miniature golf holes using the kit. A game application, or app, can allow a player to design a new hole on a phone or other computing device. Two players in remote locations can have kits that contain identical components, and those two players can use (Continued)

the app to construct identical golf holes in different remote locations. Players can design and share new holes, and can compete against each other on identical holes and compare scores using the app.

3 Claims, 28 Drawing Sheets

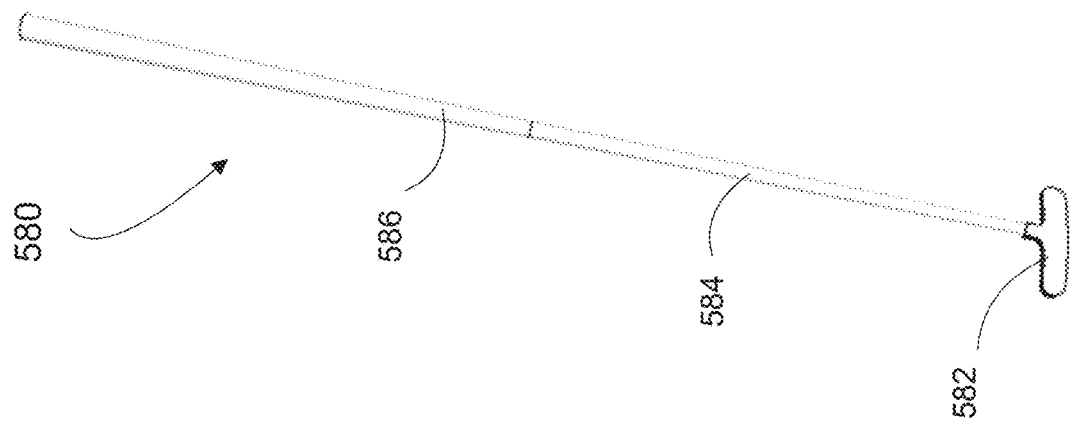
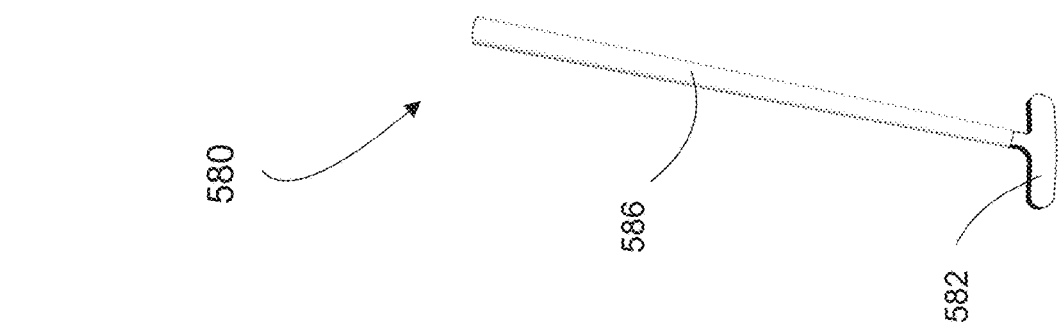
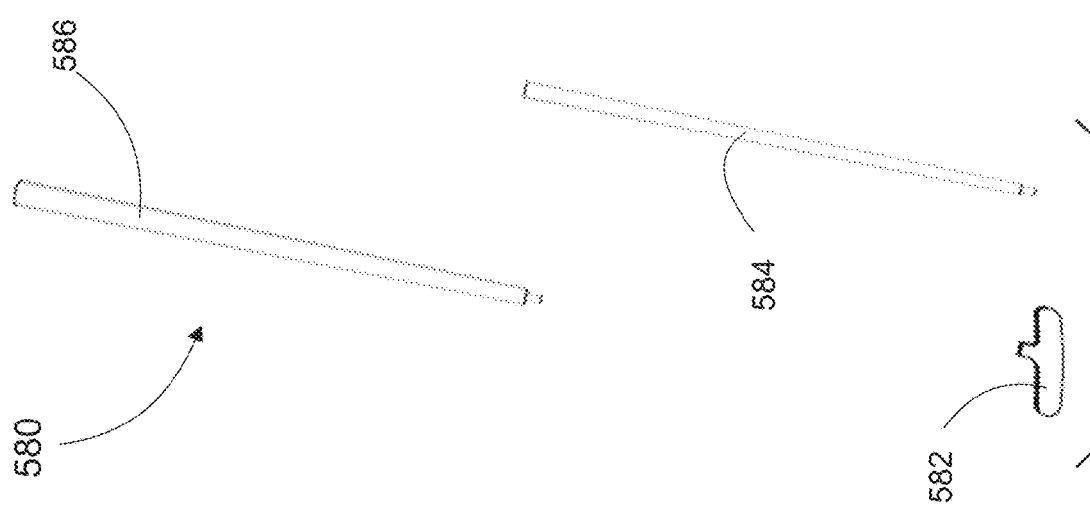

SYSTEM AND METHOD FOR ASSEMBLING AND PLAYING MODULAR MINIATURE GOLF GAMES WITH REMOTE PARTICIPANTS

RELATED APPLICATION

This application claims the benefit of U.S. Patent Application Ser. No. 63/136,711, entitled SYSTEM AND METHOD FOR ASSEMBLING AND PLAYING MODULAR MINIATURE GOLF GAMES WITH REMOTE PARTICIPANTS, filed Jan. 13, 2021, the teachings of which are expressly incorporated herein by reference.

FIELD OF THE INVENTION

This invention relates to games, and more particularly, to games that can be played between multiple players who reside in different remote locations

BACKGROUND OF THE INVENTION

Miniature golf has been popular for many decades, and can be enjoyed by families and friends of all age ranges. Miniature golf courses typically consist of multiple holes with each hole having unique shapes and/or challenges. A course is often arranged over a large area outdoors, although indoor courses are possible. A typical miniature golf course may require in the range of a half-acre to an acre of ground, including buildings and facilities, although courses can be larger or smaller.

Players typically proceed around the course from one hole to the next in a predetermined sequence of holes, with the start of the second hole near the end of the first, etc. The layout of a single hole and the sequence of holes typically remain the same throughout the life of a miniature golf course. Players can start a hole by taking turns "teeing off" onto each hole, and then one player at a time can attempt to hit the ball towards or into the cup. Only one player can be active on the hole at a time, and that player must attempt to hit the ball around or through various obstacles, changes in terrain, ball paths that require travel in multiple directions, etc. with the goal of putting the ball into the cup.

A single game of miniature golf could take approximately an hour to complete, although the time can be highly variable. The length of time to complete a game can be affected by the size or complexity of the course, along with various other factors such the skill level of individual players in a party, or a slow moving golf party that forces other groups of golfers to wait for them to finish at each hole before the next group can tee off.

It would be desirable to have a miniature golf game that could be played anywhere, without the need for a large outdoor course, or the need for a player to travel to a miniature golf facility. It would also be desirable if the individual holes, or the sequence of holes could be variable so that game play could always be new and exciting. It would be further desirable to have a game that a player could play quickly, in the comforts of the home or office, whenever the player has a few minutes to spare and without needing to travel to a course. It would be further desirable if a player or players with a few minutes to spare could play quickly, without needing to waste time waiting for slower members of the same party or slower parties playing on the next hole. It would be further desirable if more than one player could compete in the same game together, despite those players not being in the same physical location.

SUMMARY OF THE INVENTION

This invention overcomes disadvantages of the prior art by providing a system and method of playing miniature golf in a small space, while also allowing nearly endless possibilities for the layout of each hole. Multiple players can be located in different physical locations, and can arrange identical holes to compete against each other in a single game being played in multiple locations. Players can draw from a library of pre-designed holes, or can create their own holes using a selection of modular components.

In an exemplary embodiment, a system and method for creating and sharing a miniature golf hole can include assembling a miniature golf hole. Assembling a miniature golf hole can include selecting a first selection of physical miniature golf tiles from a first kit containing a first plurality of physical miniature golf tiles, assembling the first selection of physical miniature golf tiles, with one or more side edge of each tile in abutment with a side edge of one or more other tile to create a first physical playing surface with the selection of physical miniature golf tiles arranged together, and surrounding the first physical playing surface with physical sidewall components to create a first physical frame at least partially around the first physical playing surface. The method can include recording the miniature golf hole, including identifying the selection of physical miniature golf tiles in an app by selecting simulated miniature golf tiles in the app that are the same as the selection of physical miniature golf tiles, arranging the selected simulated miniature golf course tiles in the app to create a simulated playing surface within the app that is the same as the first physical playing surface, and adding simulated sidewalls to the simulated playing surface in the app. The method can include sharing the miniature golf hole with a second player, so that the second player can assemble an identical second physical golf hole, and providing instructions for the assembly of an identical miniature golf hole. Providing instructions to the second player can include instructing the second player to select a second selection of physical tiles from a second kit containing a second plurality of miniature golf tiles, instructing the second player to assemble the second selection of physical miniature golf tiles to create a second physical playing surface that is identical to the first physical playing surface; and instructing the second player to surround the second physical playing surface with physical sidewall components to create a second physical frame at least partially around the second physical playing surface. The method can also include playing the first physical golf hole and recording a score for the first physical golf hole. Illustratively, the physical miniature golf tiles include tiles having a surface simulative of at least one of a tee off location, a sand trap, a water hazard, and a decorative vertical element. The physical miniature golf tiles can each be sized between approximately 8 inches and 24 inches on at least two opposing sides of a rectangular shape. The arranging can include selecting an arrangement from a list of arrangements displayed to the first player or second player on a display screen responsive to the app. The display screen includes a display that allows identification and listing of each of the physical miniature golf tiles available to the first player and the second player. The system and method can provide a list of physical sidewall components to at least one of the first player and the second player. In illustrative embodiments, a non-transitory computer readable medium executes the steps of the system and method, and can be instantiated in whole or part on a mobile device, such as a smartphone or tablet. Remote servers (cloud, etc.) can be used, via appropriate wired and/or wireless network connections to operate various aspects of the system and method and/or store player and tile data.

In another illustrative embodiment, system and method for creating a miniature golf hole is provided. The miniature golf hole that is assembled by, at a first time, selecting a first selection of physical miniature golf tiles from a first kit containing a first plurality of physical miniature golf tiles. The first selection of physical miniature golf tiles is assembled with one or more side edge of each tile in abutment with a side edge of one or more other tile to create a first physical playing surface with the first selection of physical miniature golf tiles arranged together. At a second time, the assembled miniature golf hole according to the first selection is disassembled and a second selection of physical miniature golf tiles is made with an arrangement different from the first selection from the first kit containing the first plurality of physical miniature golf tiles. The second selection of physical miniature golf tiles is then assembled, with one or more side edge of each tile in abutment with a side edge of one or more other tile to create a second physical playing surface with the second selection of physical miniature golf tiles arranged together.

BRIEF DESCRIPTION OF THE DRAWINGS

The invention description below refers to the accompanying drawings, of which:

FIG. 5B is an exploded side view of a modular golf club system, according to an illustrative embodiment;

FIG. 5C is a side view of a short version of a modular golf club, according to an illustrative embodiment;

FIG. 5D is a side view of a long version of a module golf club, according to an illustrative embodiment;

DETAILED DESCRIPTION

A system and method for miniature golf can include a number of modular components for assembling a golf hole, and can include an app that can be used on a personal computing device to facilitate game play. The app can allow multiple players in different locations to assemble identical golf holes, and can allow those players to compete with each other at the same time or at different times, using the same holes or courses.

Figure 1A:
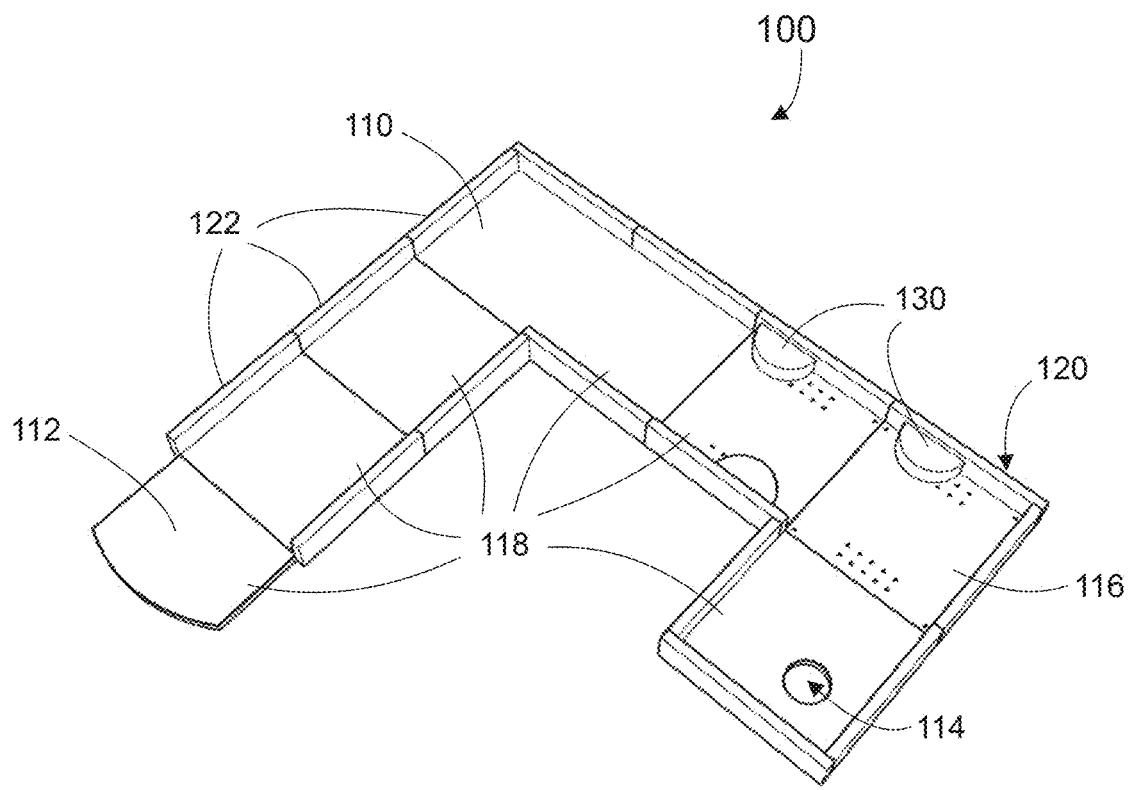
FIG. 1A is as a perspective view of a first miniature golf hole that has been assembled from modular components, according to an illustrative embodiment.

FIG. 1A is as a perspective view of a first miniature golf hole that has been assembled from modular components, according to an illustrative embodiment. As used herein, a golf hole 100 includes the entire playing field 110 from the tee-off point 112 to the goal 114, including all of the playing surface 116 that the ball can travel. The goal can be a cup, indention, or other opening in the surface of the playing field that the player tries to putt the ball into. The hole 100 can include a plurality of modular tiles 118 that can be connected together to form the playing field.

Note the term "hole", as used herein, can refer to either the physical hole within a surrounding surface that is suitably sized to allow a golf ball of standard or custom size to fall thereinto or to describe the overall structure that includes such a hole. Likewise, the term "hole" should be taken broadly to include a variety of geometrical constructs that allow a golf ball to be contained after a player directs it to a predetermined target—for example, the hole can define a cup, raised ramped structure surrounding a depression, or other bounded region.

The golf hole 100 can also be surrounded by a frame 120, and the frame can include a plurality of modular sidewalls 122 that can be arranged end to end to form a frame 120. The frame 120 can enclose all or some of the playing field 110 to prevent balls from leaving the playing field. The playing field 110 can also include one or more obstacles 130. Obstacles can include bumpers, walls, corners, traps, tunnels or other obstacles.

A player can assemble a golf hole 100 by arranging a plurality of tiles 118 to form a playing surface 116. The player can apply sidewalls 122 to the sides of tiles 118 to form a frame 120 around the playing surface 116. The player can also optionally add obstacles 130 to the playing field 110 to complete the golf hole.

Figure 1B:
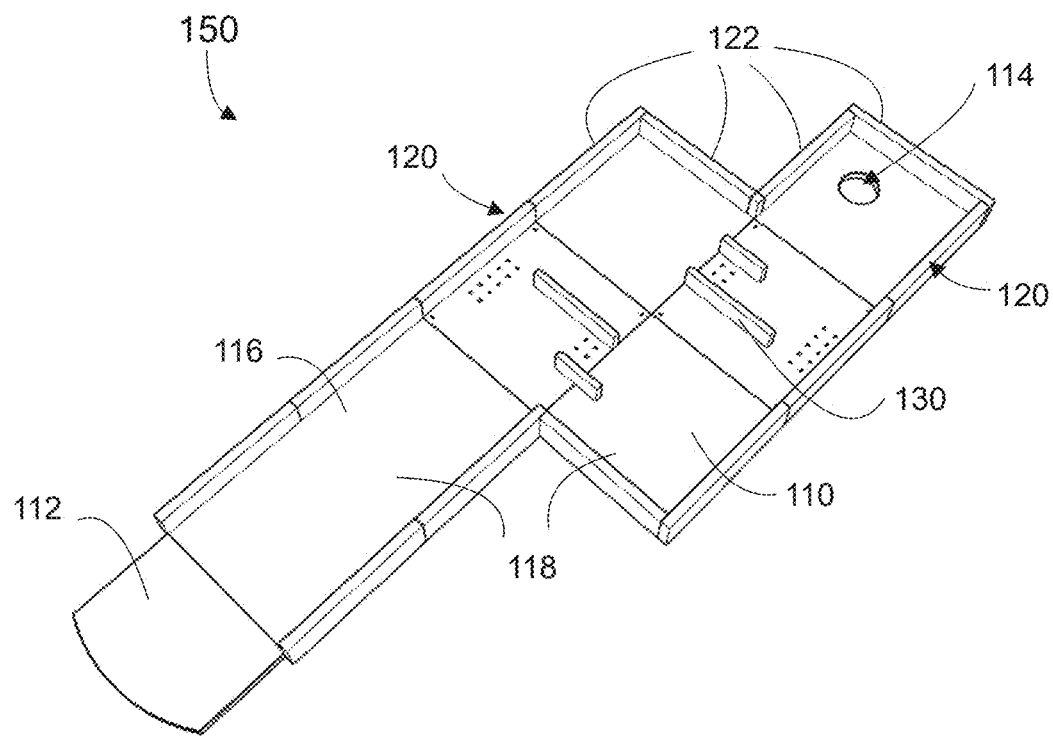
FIG. 1B is a perspective view of a second miniature golf hole that has been assembled from modular components, according to an illustrative embodiment

FIG. 1B is as a perspective view of a second miniature golf hole 150 that has been assembled from modular components, according to an illustrative embodiment. A player can rearrange the same components to create and play a large number of different golf holes. The modular components can be disassembled and reassembled in any number of ways, and depending on the number of tiles in a player's kit, a player may be able to create a nearly infinite number of different golf holes.

Figure 2A:
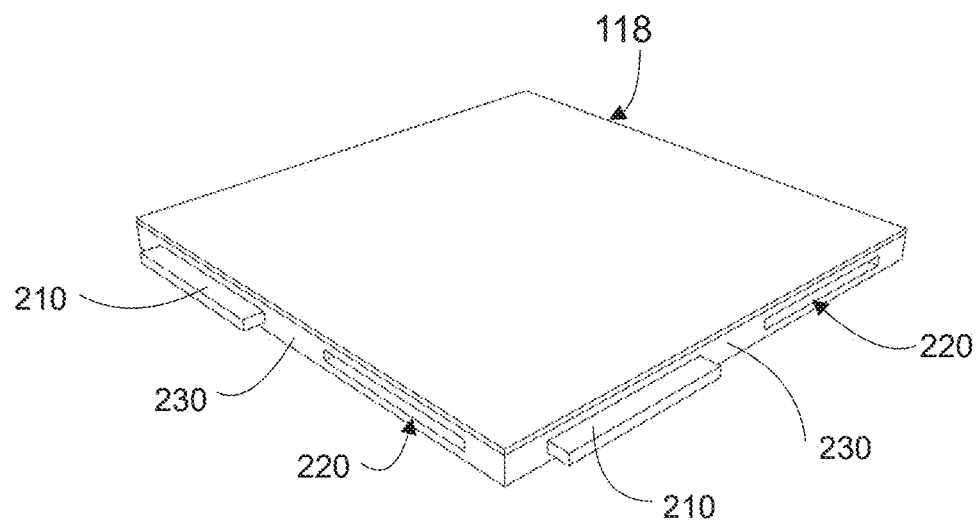
FIG. 2A is a perspective view of a single tile, showing a blade and slot design used to connect multiple modular components, according to an illustrative embodiment.

FIG. 2A is a perspective view of a single tile, showing a blade and slot design used to connect multiple modular components, according to an illustrative embodiment. An individual tile 118 can have a blade 210 and a slot 220 on each edge 230. The blade and slot system allows for the blade 210 of a first tile to slide into the slot of a second tile, while the blade of the second tile also slides into the slot of the first tile. By engaging the both sets of blades and slots together, the two tiles can be interlocked together forming a portion of the playing surface. The locations of blade 210 and slot 220 can be the same on each edge 230 of a tile 118, and the locations of blades 210 and slots 220 can be the same for the edges of each different tile, so that any two tiles can be interlocked together in a number of different arrangements.

Figure 2B:
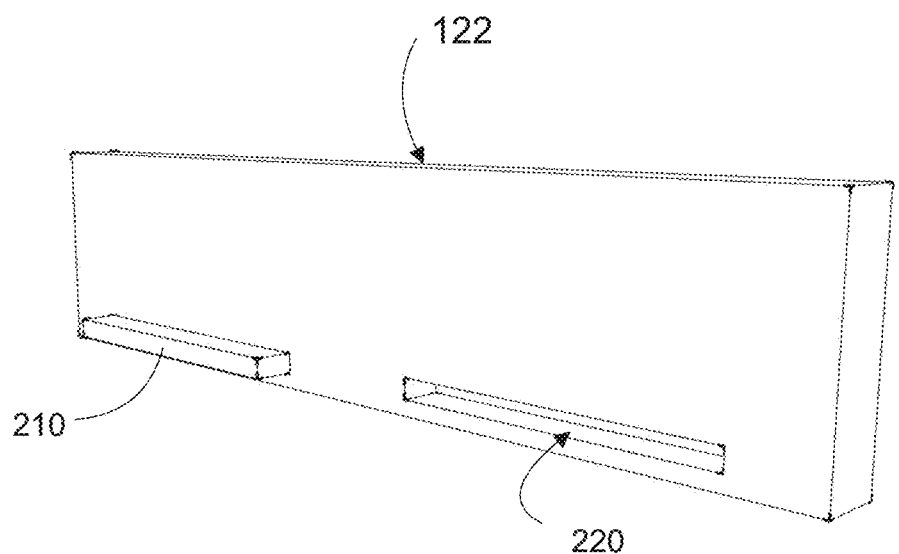
FIG. 2B is a perspective view of a single sidewall, showing the blade and slot design used to connect the sidewall to one or more tiles, according to an illustrative embodiment.

FIG. 2B is a perspective view of a single sidewall, showing the blade and slot design used to connect the sidewall to one or more tiles, according to an illustrative embodiment. A sidewall 122 can also have a corresponding blade 210 and slot 220 that allows a sidewall 122 to interlock with one or more tiles. Sidewalls can come in various lengths including longer sidewalls for convex portions of a frame and shorter sidewalls for use in concave portions of a frame.

Figure 3A:
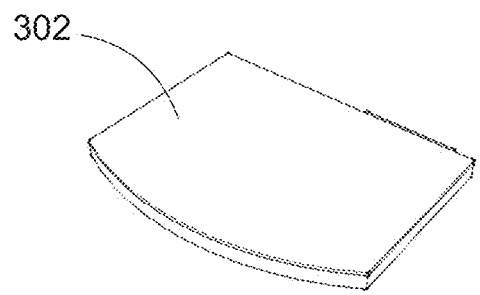
FIG. 3A-3R are perspective views of various modular tiles that can be combined to create a playing field for a hole, according to illustrative embodiments.
Figure 3B:
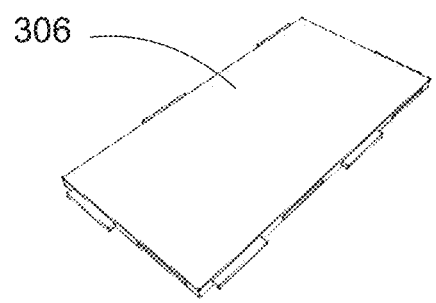
Figure 3C:
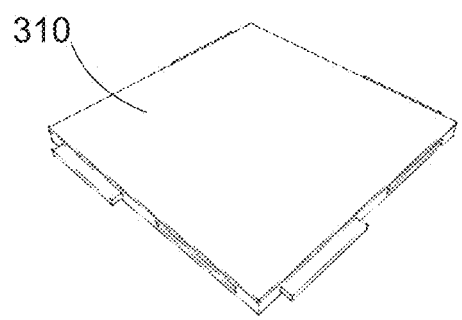
Figure 3D:
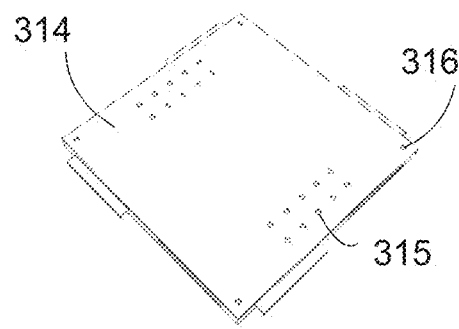
Figure 3E:
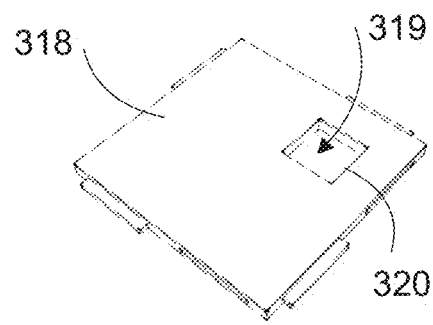
Figure 3F:
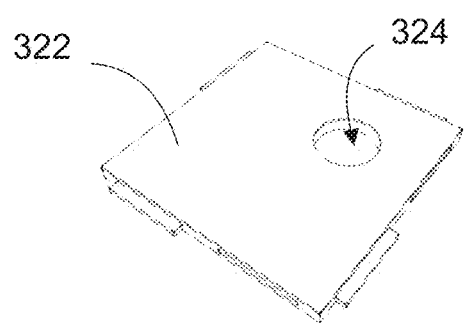
Figure 3G:
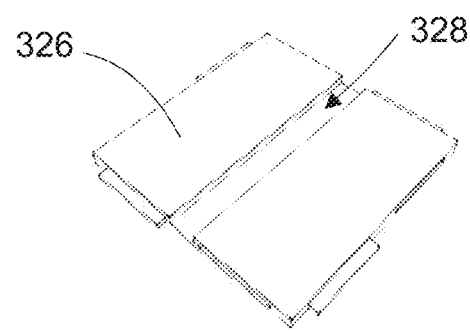
Figure 3H:
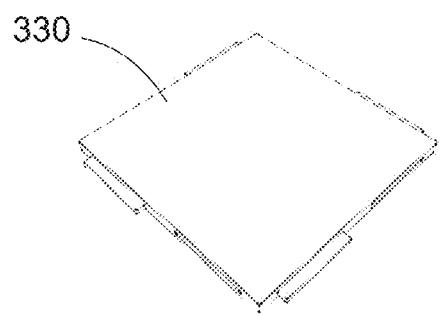
Figure 3I:
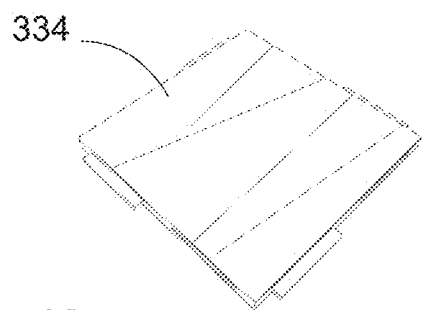
Figure 3J:
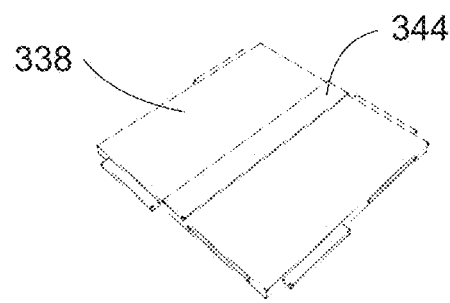
Figure 3K:
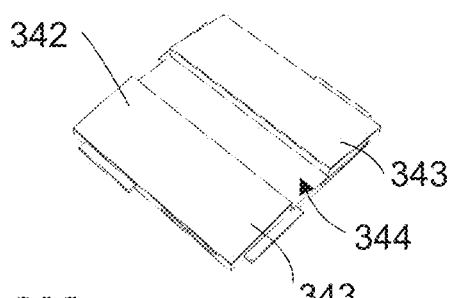
Figure 3L:
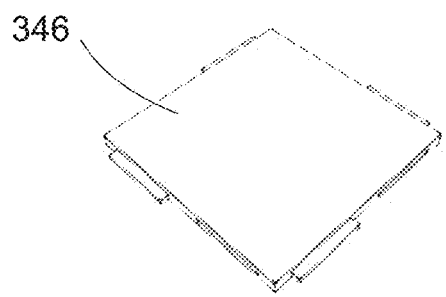
Figure 3M:
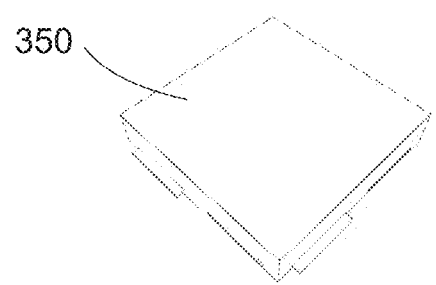
Figure 3N:
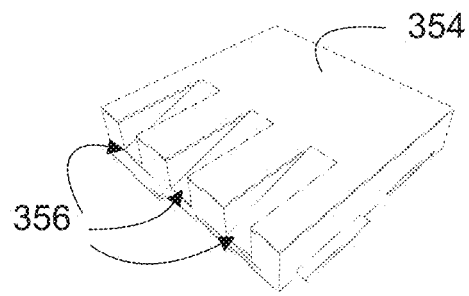
Figure 3O:
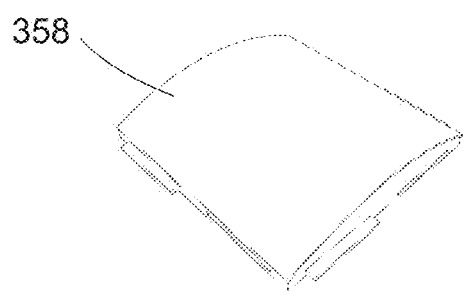
Figure 3P:
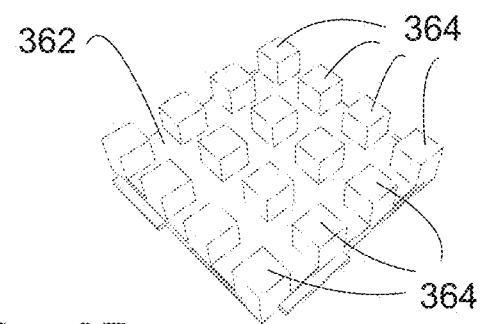
Figure 3Q:
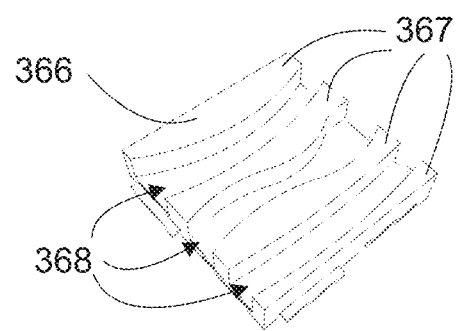
Figure 3R:
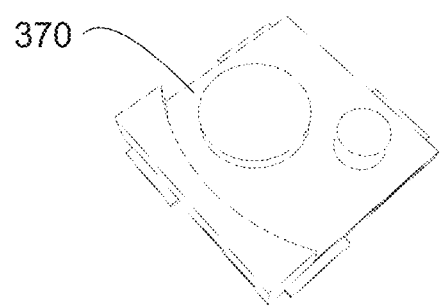

FIG. 3A-3R are perspective views of various modular tiles that can be combined to create a playing field for a hole, according to illustrative embodiments. Each modular tile can have a playing surface that can be felt, or can be made of carpet or other surfaces for a golf ball to roll over. Special tiles can have various different surfaces, but unless otherwise specified, each tile has the same standard surface such as felt or carpet.

FIG. 3A is a perspective view of a tee-off tile, according to an illustrative embodiment. A tee-off tile 302 can be approximately 12 inch×8 inch, although various sizes are possible. The tee-off tile 302 can be unique in that only one edge of the tile has a blade and slot to connect to the rest of the playing field.

FIG. 3B is a perspective view of a foundation tile 306, according to an illustrative embodiment. The foundation tile can be approximately 12 inch×24 inch, although various sizes are possible. The foundation tile can be sized and shaped similar to multiple tiles together. In the example shown in FIG. 3B, the foundation tile 306 can have one blade and slot on each of the short dimensions, and two sets of blades and slots on each longer dimensions. The foundation tile 306 can serve as a straightaway, or can be used for longer greens or as part of a larger space on the green.

FIG. 3C is a perspective view of a basic tile 310, according to an illustrative embodiment. The basic tile 310 can be approximately 12 inch by 12 inch, although various sizes are possible. The size of the basic tile can be referred to as the standard size, and unless otherwise specified, all of the tiles described below are the same standard size as the basic tile 310.

Note that, while a 12 inch by 12 inch tile is contemplated as one standard size, 24 inch by 24 inch standard times can be used in (typically) non-portable embodiments, such as for use in a facility like a daycare or other location where tiles do not need to be moved significantly. Likewise, an embodiment for use in entertainment venues, such as a carnival can be provided, in which the object of the game is to score points instead of getting the lowest score. This version would consist of tiles similar skeeball, bowling pins, etc. that simulate carnival midway games.

FIG. 3D is a perspective view of an obstacle tile 314, according to an illustrative embodiment. An obstacle tile 314 can have can have a number of holes 315 in the center and side areas of the surface for attachment of obstacle walls, tunnels, vertical obstacles, and/or other features. The obstacle tile 314 can also have four corner holes 316 for corner obstacle attachment.

FIG. 3E is a perspective view of a feature tile 318, according to an illustrative embodiment. A feature tile 318 can have a feature hole 319 that can used to insert a sand trap, water hazard, various vertical elements such as a lighthouse or windmill, or other various features into a playing field. A feature hole 319 can be approximately 3 inch×3 inch, although various sizes are possible. A feature tile 318 can include a feature insert tray 320. The feature hole 319 can be offset towards one corner of the feature tile 318, so that a user can place the feature in four different locations by rotating the feature tile 318 into four different positions.

FIG. 3F is a perspective view of a cup tile 322, according to an illustrative embodiment. A cup tile 322 can have a single hole, or cup 324 for a golf ball to be hit into. The cup 324 can be offset towards the corner of the cup tile 322, so that a user can place the cup 324 in four different locations by rotating the cup tile 322 into four different positions.

The above can allow a player to form a myriad of complete golf holes, however, various specialty tiles are also possible and can compound the possibilities for hole constructions. FIG. 3G is a perspective view of a moat tile 326, according to an illustrative embodiment. A moat tile 326 can have a depressed area, or moat, 328 across the width of the tile. The moat can be filled with sand or other items to serve as a trap for the ball. A bridge or similar feature (not shown) can be added to the tile to bridge the moat. In various embodiments, there can be a one stroke penalty for a ball trapped in a moat.

FIG. 3H is a perspective view of a slip tile 330, according to an illustrative embodiment. A slip tile 330 can have a flat, slippery surface, such as aluminum, other metals, plastics, or other smooth surfaces. The sip tile 330 can affect the deceleration or speed of the ball, and may allow the ball to move in different directions.

FIG. 3I is a perspective view of a multi-tile 334, according to an illustrative embodiment. A multi-tile 334 can include multiple surfaces that can affect the way a ball travels in different ways.

FIG. 3J is a perspective view of a gauntlet tile 338, according to an illustrative embodiment. A gauntlet tile 338 can have a small strip 340 of standard surface, such as felt, down the middle of the tile. Game play can include a one stroke penalty for a ball that contacts a portion of the gauntlet tile 338 outside of the strip 340.

FIG. 3K is a perspective view of a ramp-moat tile 342, according to an illustrative embodiment. A ramp-moat tile 342 can have two ramp sections 343 that start on two edges and ramp up to a moat 344 down the middle of the tile.

FIG. 3L is a perspective view of a slow tile 346, according to an illustrative embodiment. A slow tile 346 can have a surface that decelerates a ball faster than a standard surface. The surface can be rough, and can be made of rubber or other textured materials.

FIG. 3M is a perspective view of a tall tile 350, according to an illustrative embodiment. A tall tile 350 can be taller than a standard tile, such as approximately 2.5 inches tall, although various heights are possible. A tall tile can require a tall tile ramp (described below) to allow the ball to reach the top surface of the tall tile.

FIG. 3N is a perspective view of a tall diverter tile 354, according to an illustrative embodiment. A tall diverter tile 354 can be taller than a standard tile, such as approximately 2.5 inches tall, although various heights are possible. The tall divert tile 354 can have a plurality of diverter ramps 356 that can send the ball to different places, depending on which ramp the ball goes down.

FIG. 3O is a perspective view of a hill tile 358, according to an illustrative embodiment. A hill tile 358 can have an arc across the surface from a first side to a second side, with the center being higher than either side.

FIG. 3P is a perspective view of a tic-tac tile 362, according to an illustrative embodiment. A tic-tac tile 362 can have alternating tall squares 364 forming an obstacle path for a ball.

FIG. 3Q is a perspective view of a canyon tile 366, according to an illustrative embodiment. A canyon tile 366 can have tall segments 367 that form canyons 368 for a ball to pass through.

FIG. 3R is a perspective view of an exemplary geometry tile 370, according to an illustrative embodiment. In various embodiments, a geometry tile 370 can have various geometric forms and/or curves on the surface.

Various combinations of tiles, including tiles described above, can be combined together to create a wide variety of different golf holes, and sidewalls can be placed around the edges to keep a ball within the playing field. A player can also add various obstacles and/or other features, including but not limited to, the obstacles and features described below. The obstacles and features described below can be designed to engage with the holes in obstacle tiles or feature tiles.

Figure 4A:
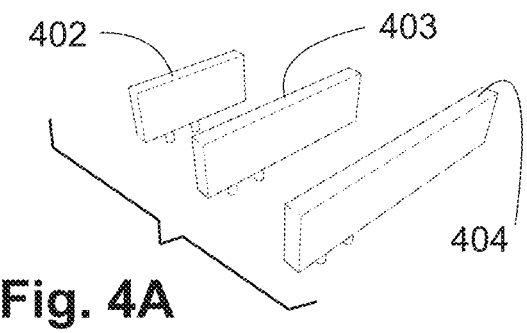
FIGS. 4A-K are perspective views of obstacles and other features that can be added to a playing field for a hole, according to an illustrative embodiment.

FIG. 4A is a perspective view of standard obstacle walls, according to an illustrative embodiment. Obstacle walls can have various lengths, such as obstacle walls 402, 403, and 404, and can span part of the distance across a tile. As shown, obstacle walls can be approximately 4 inches, 6 inches, and 8 inches, although various sizes are possible. Various obstacles, including obstacle walls 402, 403, and 404 can have pegs 406 that are designed to engage with holes in the surface of a tile such as an obstacle tile.

Figure 4B:
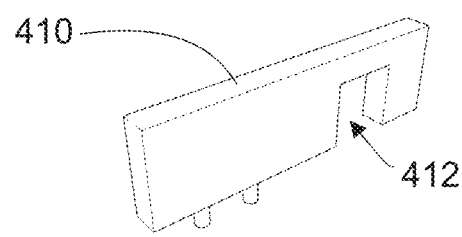

FIG. 4B is a perspective view of a cutout obstacle wall 410, according to an illustrative embodiment. A cutout obstacle wall 410 can have a cutout 412 for a ball to pass through, and can have various wall lengths and various shapes and/or sizes of the cutout 412.

Figure 4C:
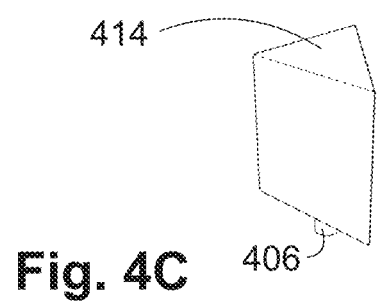

FIG. 4C is a perspective view of an obstacle corner 414, according to an illustrative embodiment. An obstacle corner 414 can have one or more pegs 406 that are designed to engage with corner holes in the surface of a tile such as an obstacle tile, so that the obstacle corner can be positioned in the corner of the tile as an obstacle, diverter, or redirector.

Figure 4D:
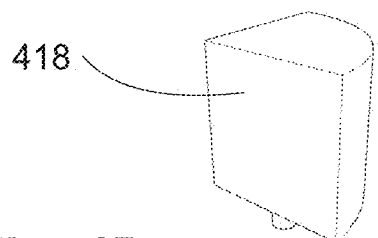

FIG. 4D is a perspective view of a quarter-round obstacle corner 418, according to an illustrative embodiment. A quarter-round obstacle corner 418 can be designed to engage with corner holes in the surface of a tile, and can come in various shapes and sizes.

Figure 4E:
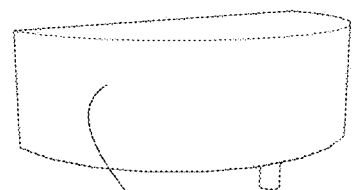

FIG. 4E is a perspective view of an obstacle half-circle 422, according to an illustrative embodiment. The obstacle half-circle can have multiple pegs on the bottom to engage with holes in the surface of a tile.

Figure 4F:
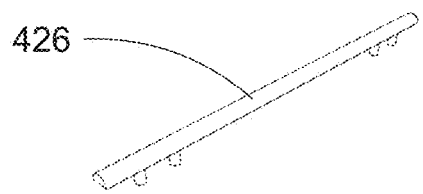

FIG. 4F is a perspective view of a bump bar 426, according to an illustrative embodiment. The bump bar 426 can be semi-cylindrical, and can have a felt surface. The bump bar can act as an obstacle or a speed bump, and multiple bump bars can be arranged together to trap golf balls between them.

Figure 4G:
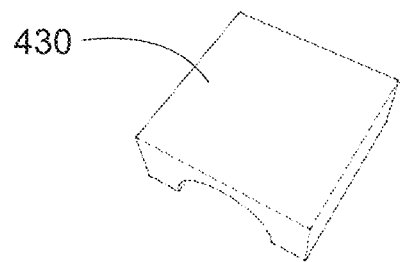

FIG. 4G is a perspective view of a tunnel 430, according to an illustrative embodiment. A tunnel 430 can be various sizes, lengths, widths, heights, and/or shapes, and can allow a player to hit a ball in one side of the tunnel and out of the other side.

Figure 4H:
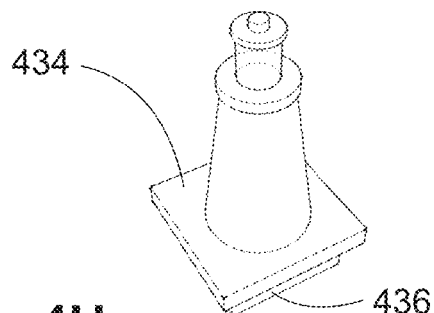

FIG. 4H is a perspective view of an exemplary vertical obstacle 434, according to an illustrative embodiment. The vertical obstacle 434 can have a base 436 designed to engage with a hole on a feature tile.

Figure 4I:
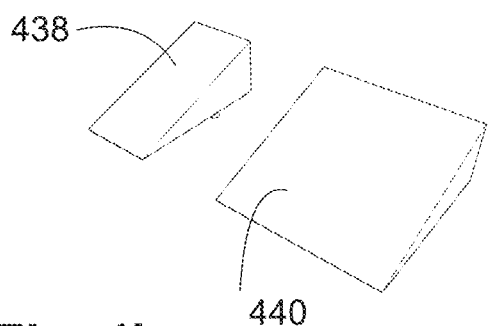

FIG. 4I is a perspective view of various ramps, according to an illustrative embodiment. Ramps 438 and 440 can have pegs to engage with the surface of one tile, and can provide a path for a ball to get between a first tile and the upper surface of an adjoining tile that has tall features, such as tall diverter tile or canyon tile.

Figure 4J:
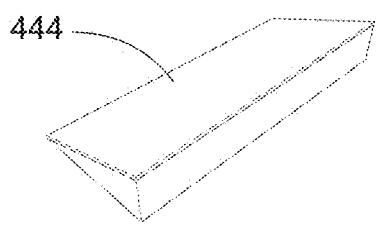

FIG. 4J is a perspective view of a tall tile ramp 444, according to an illustrative embodiment. A tall tile ramp 444 can provide a path for a ball to get between a first tile and the upper surface of an adjoining tall tile. A tall tile can have two obstacle tiles on two sides, so that two ramps can be placed on two sides of the tall tile to create a ball path that includes the tall tile.

Figure 4K:
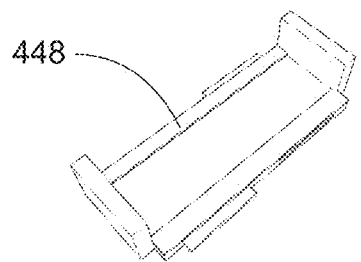

FIG. 4K is a perspective view of a side-mount trap 448, according to an illustrative embodiment. A side-mount trap 448 can take the place of any sidewall along the side of another tile, or can be placed between two tiles as part of a ball path. In various embodiments, a one stroke penalty can be assessed for a ball that gets stuck in the trap.

The above described obstacles are only exemplary, and various other obstacles are possible. By way of non-limiting example, other obstacles and/or features could include a bridge, pinball-style spring-loaded sideboards on a sidewall, a 360 loop track, or other possibilities.

Figure 5A:
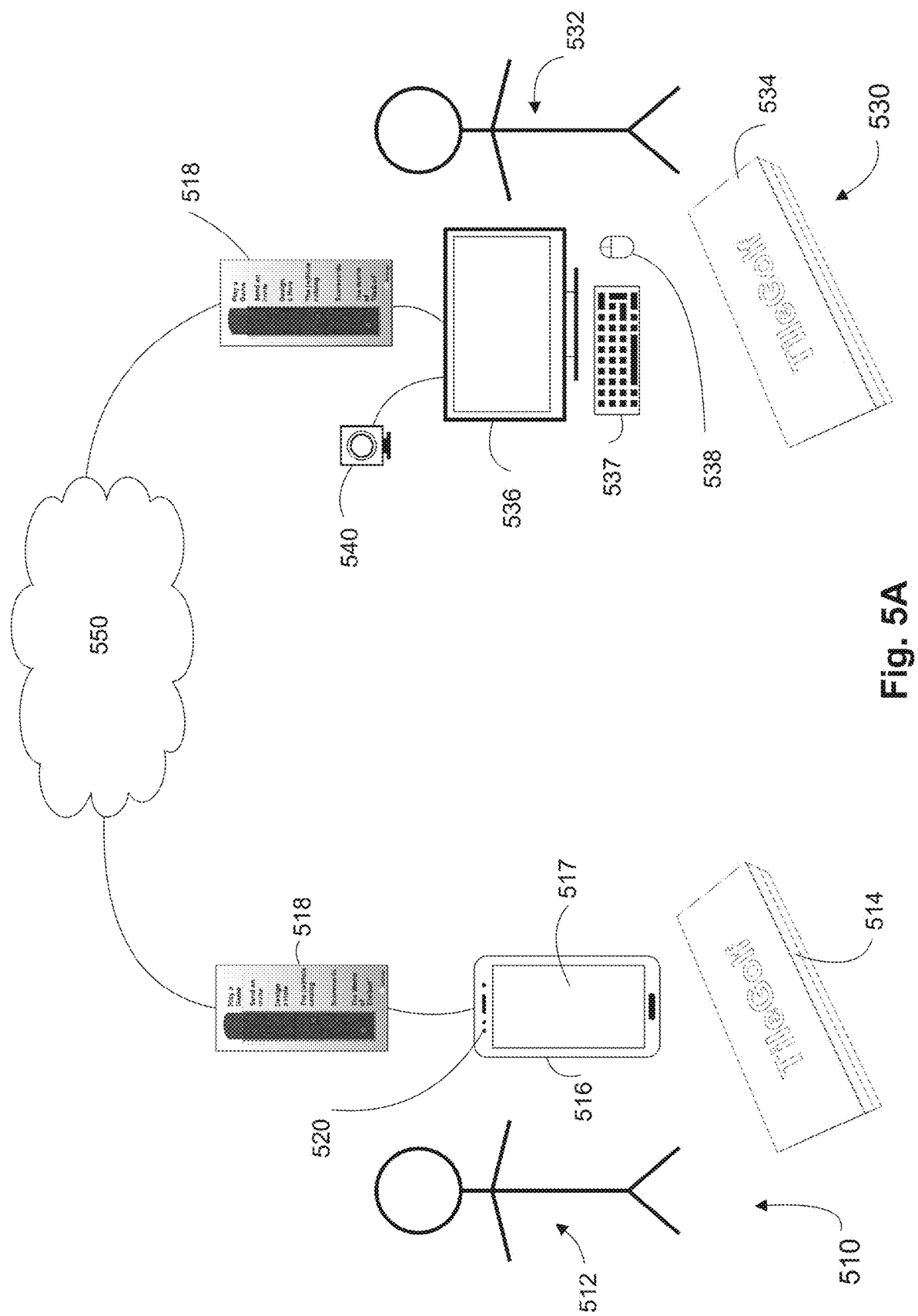
FIG. 5A is a schematic diagram of a remote golf game, according to an illustrative embodiment.

The system and method for playing miniature golf can include an app for a mobile device, such as a cell phone/smartphone, tablet, or other appropriate computing device. The app can allow multiple players in different locations to play a game of miniature golf together, using identical golf holes. Up to four or more players can play together in a single game, and those players can be in one, two, three, four, or more locations at the same time. FIG. 5A is a schematic diagram of a remote golf game, according to an illustrative embodiment. A remote golf game 500 can include a first player 512 playing in a first location 510, and second player 532 playing in a second location 530. Although more players and more environments are possible, FIG. 5 shows only two players in two locations for the sake of clarity. Each player can have a kit 514, 534 that includes various modular miniature golf components, such as the components described above, along with at least one golf ball and putter. It should be clear that an individual kit does not need to have all of the components listed above, and the two kits shown here 514, 534 do not need to be identical, however, the two kits will need to have sufficient identical components to allow the two players to construct identical golf holes.

Each player can have a cell phone 516 or other computing device 536, and each computing device can have a display screen 517 and an interface, such as a keyboard 537 and mouse 538. Both players can have the game application (hereinafter "app") 518 loaded on their phone or other computing device. Each app can have access to the internet 550, and the two computing devices can exchange information through the apps 518 over the internet. A first player can use the app to send an invite to one or more additional players to start a golf game. The players can then use the apps on their respective computing devices to coordinate game play. The app coordinates game play so that each player constructs identical golf holes, and plays the same golf hole. The app also allows each player to enter a score for each hole, and the scores can be shared with all players. In various embodiments, the app can also allow players to send messages to each other, talk to each other in real time, show videos of game play, and/or other various ways for players to interact with each other before, during and after the game. In various embodiments, a computing device can have a built-in camera 520, or access to a remote camera 540, so that one player can watch the other player's game play.

A player may choose to construct a golf hole on the upper surface of a table or other raised surface. FIG. 5B is an exploded side view of a modular golf club system that allows the same club to be used for games assembled on the floor and for games assembled on a table top or other raised surface. A modular golf club 580 can have a club head 582, one or more center shaft sections 584, and a handle segment 586. The various segments 582, 584, and 586 can have complimentary screw threads, or spring loaded buttons that can engage in holes, or other various means for connection that will be clear to one skilled in the art. A player can assemble a short version of a club, as shown in FIG. 5C, by leaving one or more center shaft sections 584 out of the club. The short version of the club can then be used by a handicapped player in a wheel chair, or by a small child, or by a player who wants to play the miniature golf game on a table top. A player can also assemble a full-length version of club 580 with all of the shaft sections, as shown in FIG. 5D, to play a hole assembled on the floor.

Turning to FIGS. 5A-5D, players who are playing the same game together in different locations can, by way of non-limiting example, play the game with the hole assembled on the floor at location 510, while another player can play the same hole assembled on a table top at location 530. Players in different locations can use the kits and app to play identical holes with one player playing a floor-based hole using a longer club and another player playing a table-based hold using a shorter club. Club lengths can also be adjusted to accommodate handicapped players and/or players of different heights, without needing to have a large number of clubs in the kit. All of the players, no matter their location or their preferred hole height (floor, table, or otherwise), can all play the same game together, in separate locations, using the app and a kit in each location.

Figure 6:
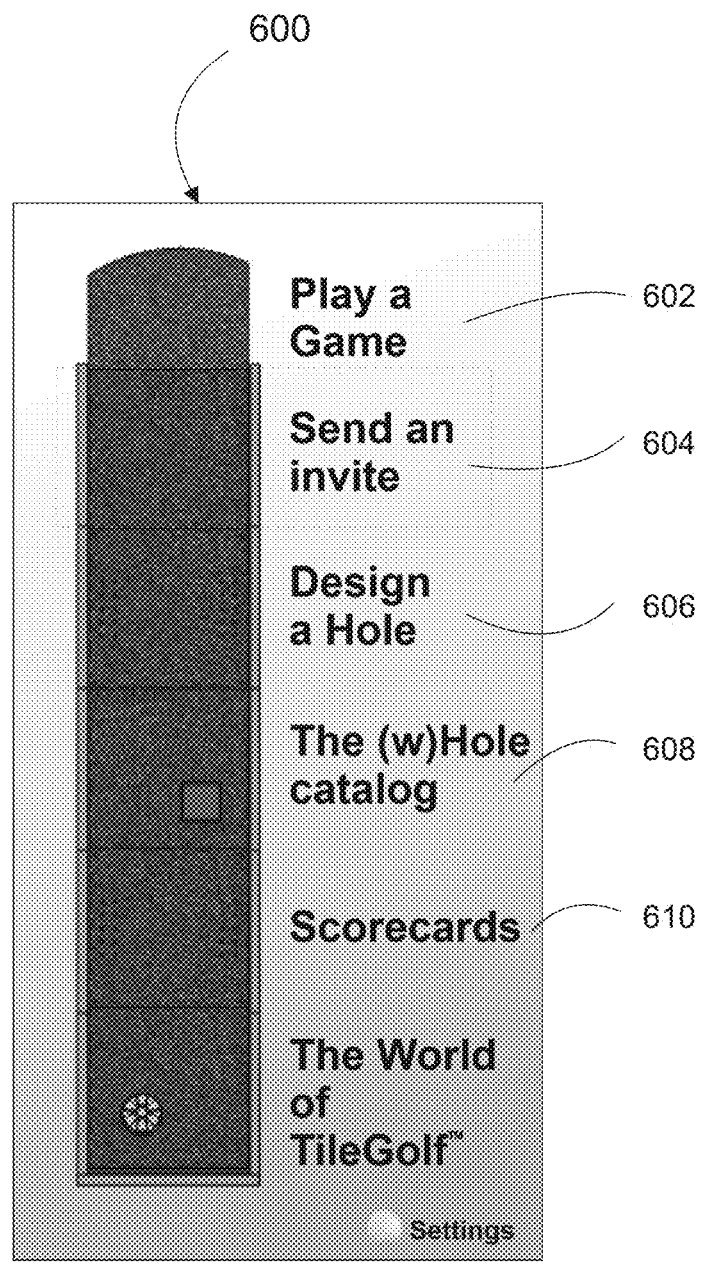
FIG. 6 is an exemplary app home screen showing options for using the game app, according to an illustrative embodiment.

FIG. 6 is an exemplary app home screen 600 showing options for using the game app, according to an illustrative embodiment. A home screen can include options to play a game 602, send an invite to other players to play together 604, design a new golf hole 606, view a catalog of previously created hole designs 608, or view scorecards of previous games 610.

Figure 7:
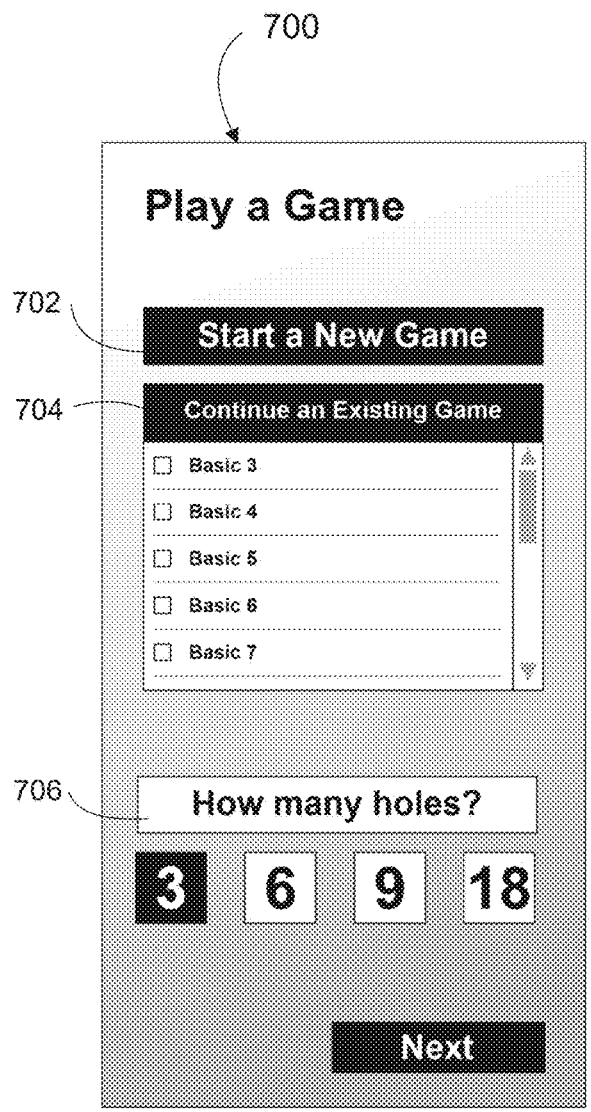
FIG. 7 is an exemplary first game setup screen, according to an illustrative embodiment.

Selecting the play a game option 602 can lead to a first game setup screen 700, as shown in FIG. 7. A player can have the option to start a new game 702, and can have the option to select how many holes to play in a game 706. A player who has only a few spare minutes in the middle of an otherwise busy day can elect to play a game with a small number of holes, while a player with more time can elect a longer game. A player can have the option to pause and save a game that has not been finished, and the first game setup screen 700 can include an option to resume an existing saved game 704. It should be noted that two or more players can also play a game together, using identical layouts for the holes, but the players do not need to play the game together at the same time. For example, one player can initiate a game, invite other players, and play the game, and then a second player can continue the existing game at a later time, or even a later day, and can continue playing the same game with the same holes. The players can then compare scores after all players have finished the game.

Figure 8:
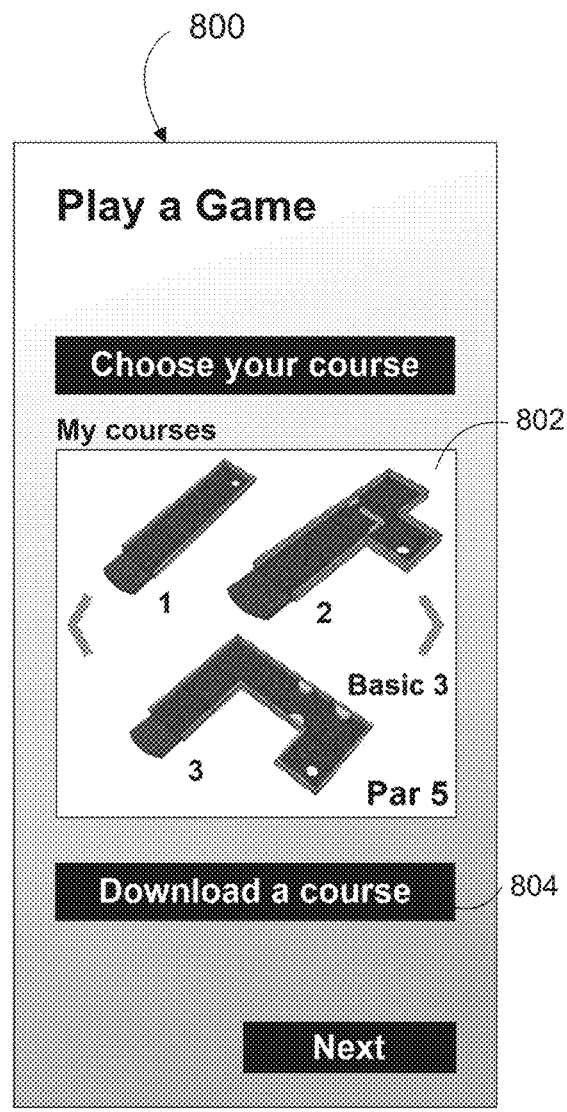
FIG. 8 is an exemplary course selection screen, according to an illustrative embodiment.

FIG. 8 is an exemplary course selection screen 800, according to an illustrative embodiment. A player can have a saved collection of favorite courses 802 on that player's app, and each player can have different collections of saved favorite courses. A course can consist of any number of different holes, and together group of holes makes up a course. Any player can invite another player to play on any course. The course selection screen can also include an option for a player to download additional courses 804 over the internet. The option to download new courses allows a player to play a new course every game, without ever needing to play the same course twice. A player also has the option to save any course so they can be played again and/or played with other players.

Figures 9, 10:
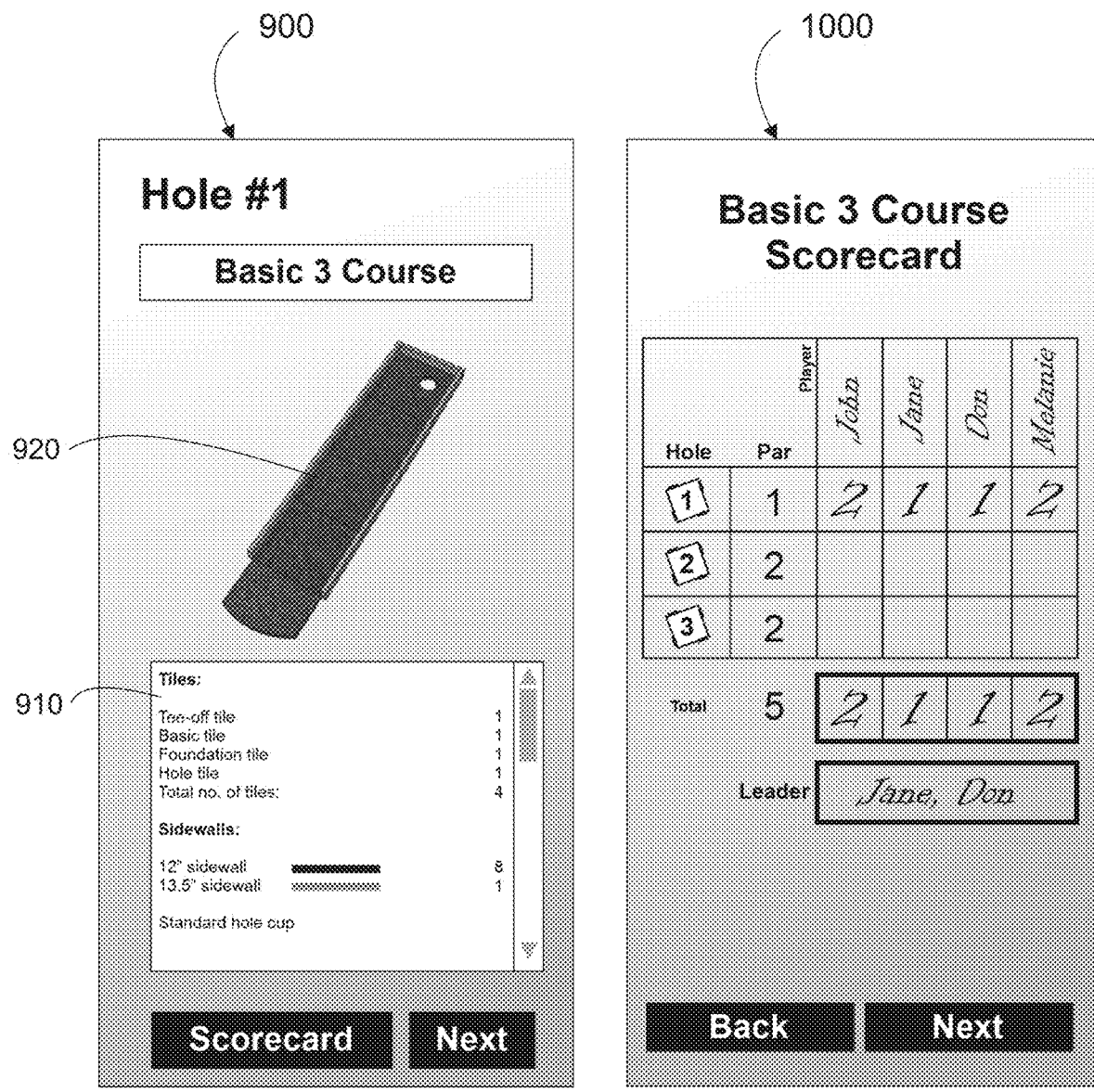
FIG. 9 is an exemplary first hole setup screen, according to an illustrative embodiment.
FIG. 10 is an exemplary score screen, according to an illustrative embodiment.

FIG. 9 is an exemplary first hole setup screen, according to an illustrative embodiment. A hole setup screen 900 can provide a blueprint that allows each player in a remote game to build identical physical golf holes, so that all of the remote players are playing an identical game together, regardless of their location. The hole setup screen provides a list 910 that identifies all of the components that will be used to assemble the hole and can provide a count for each component. The app also provides a diagram 920 that shows each player how to assemble the hole. Players can use the diagram 920 to ensure they are each assembling their holes the same way, as shown, so that each player in a remote game is playing an identical hole.

After assembling the first hole, a player can play the newly assembled hole and can count score, as is known in miniature golf. Players can each enter their own scores in a score screen 1000, as shown in FIG. 10. The score screen can include each player and each hole, with a place to record each player's score for each hole. After each hole, the player can disassemble that hole, and prepare to assemble the next hole.

Figure 11:
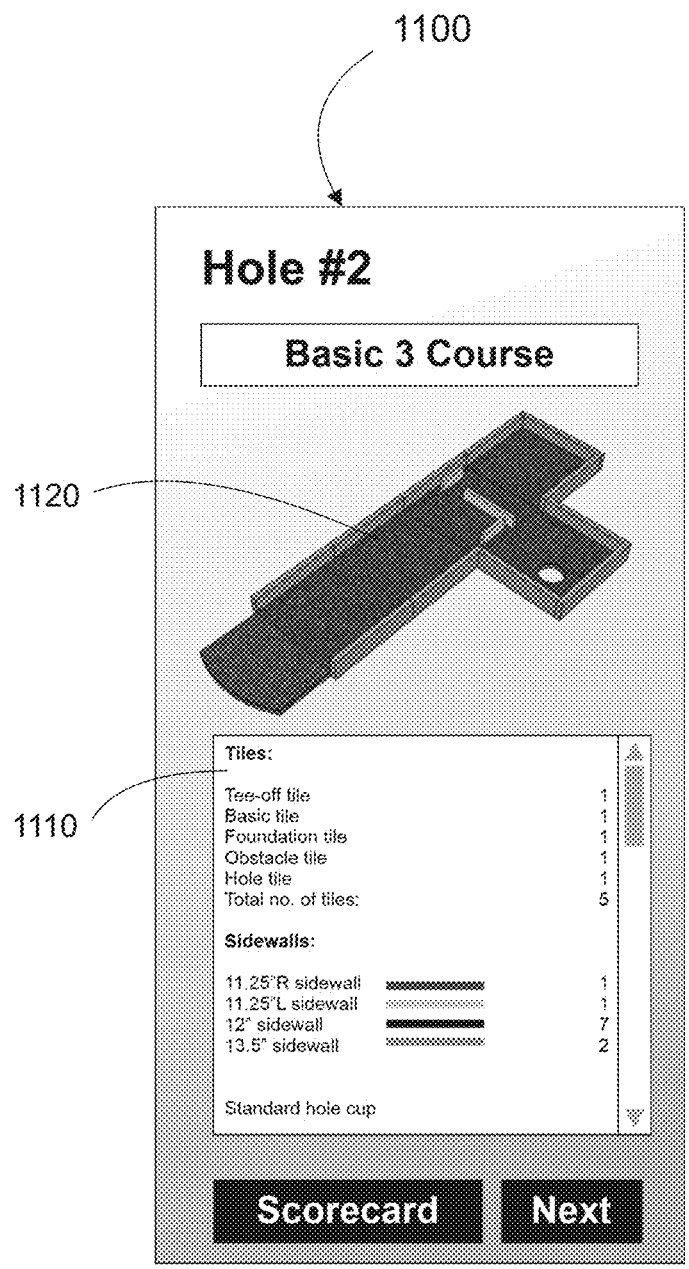
FIG. 11 is an exemplary second hole setup screen, according to an illustrative embodiment.

FIG. 11 is an exemplary second hole setup screen 1100, according to an illustrative embodiment. Each hole setup screen can provide a blueprint that allows each player to set up the next hole, with each player in a remote game setting up identical holes regardless of their locations. The second hole setup screen provides a new component list 1110 listing the parts that that will be used to assemble the second hole, and a new diagram 1120 that shows each player how to assemble the second hole. Players can use the diagram 1120 to ensure they are each assembling their holes in the same way, as shown, so that each player in a remote game is playing an identical hole. After assembling the second hole, a player can play the second hole and count score, as is known in miniature golf. Each new score can be entered into the score screen.

Players can repeat the cycle of assembling a new hole, playing the hole, and entering the score until they have completed the course. Players can play simultaneously, and can chat or talk with each other as each hole is being played, or they can complete each game at their own pace and then compare scores later. Scores can be shared through the app as the course is being played and/or after the each player has completed the course. Players can also play at different times or even different days, and can compare scores after the last player has finished.

Figure 12:
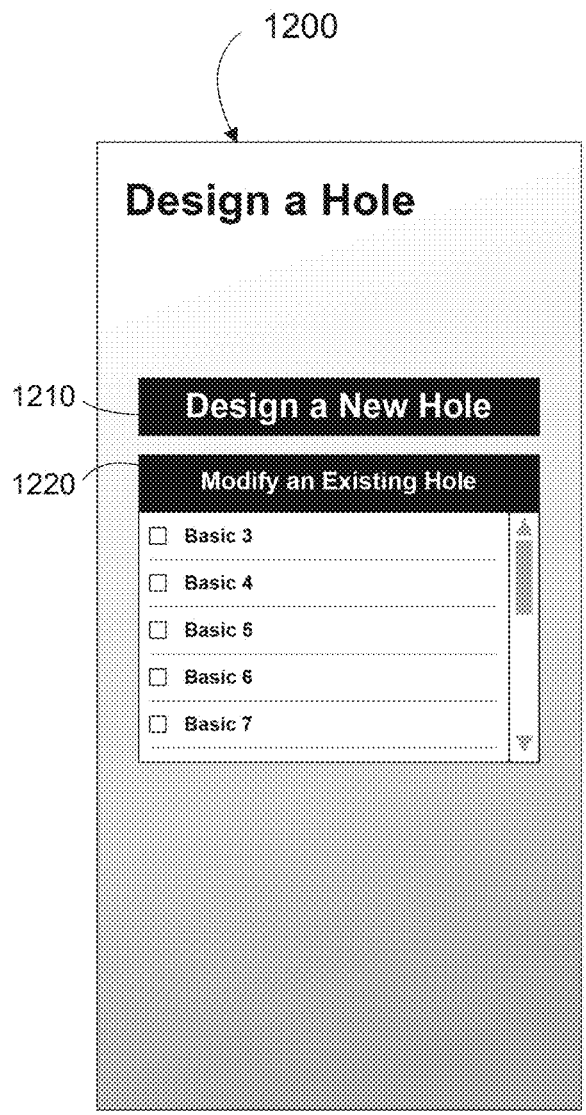
FIG. 12 is an exemplary screen for selecting a hole to design, according to an illustrative embodiment.
Figure 13:
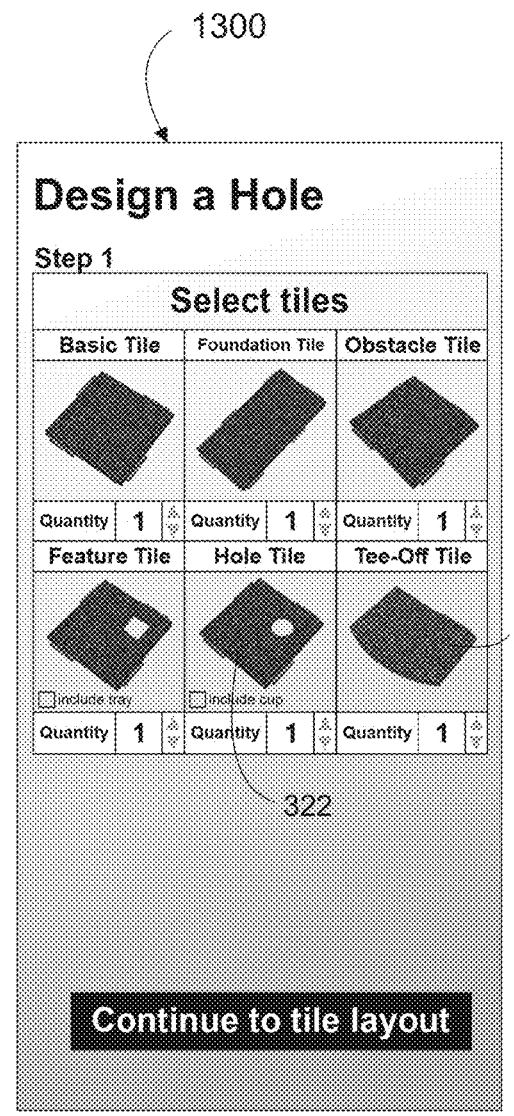
FIG. 13 is an exemplary tile selection screen for designing a new hole, according to an illustrative embodiment.

The app can also allow a player to design new holes and new courses. FIG. 12 is an exemplary hole selection screen 1200 showing options for designing a new hole. A player can choose between designing a new hole 1210 and modifying an existing hole 1220. FIG. 13 is an exemplary tile selection screen for designing a new hole, according to an illustrative embodiment. A tile selection screen 1300 can allow a player to select which tiles to use, and the quantity of each tile that will be used to create the new hole. A single tee-off tile 302 and a single hole tile, or cup tile 322 are typically included in all holes, and a player then has the option to include any number of additional tiles to create novel holes.

Figure 14A:
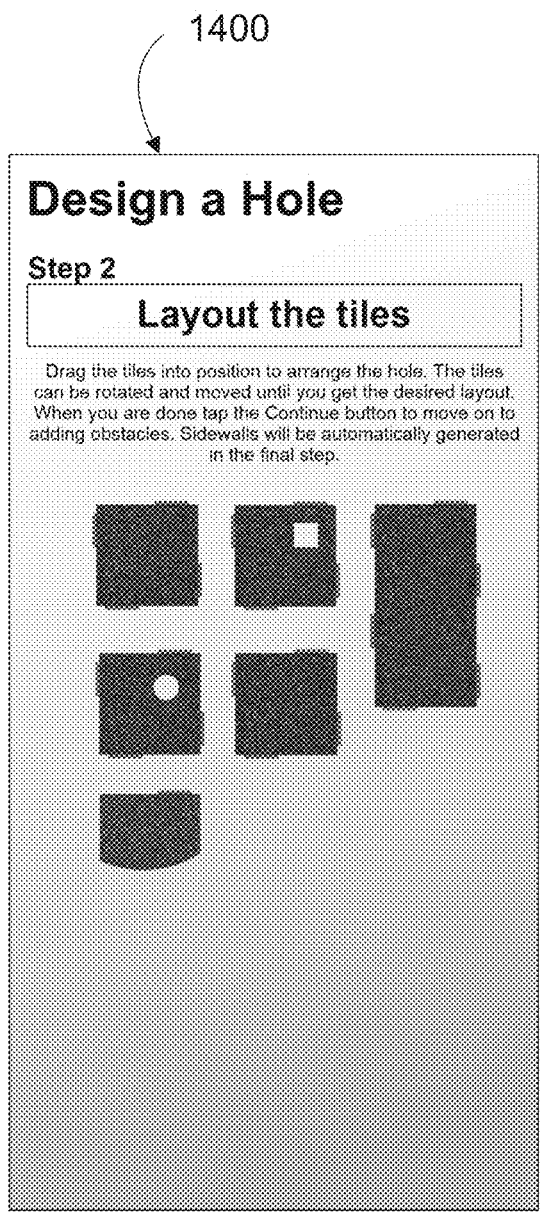
FIG. 14A is an exemplary tile arrangement screen for laying out a new hole, showing the selected tiles to be arranged, according to an illustrative embodiment.
Figure 14B:
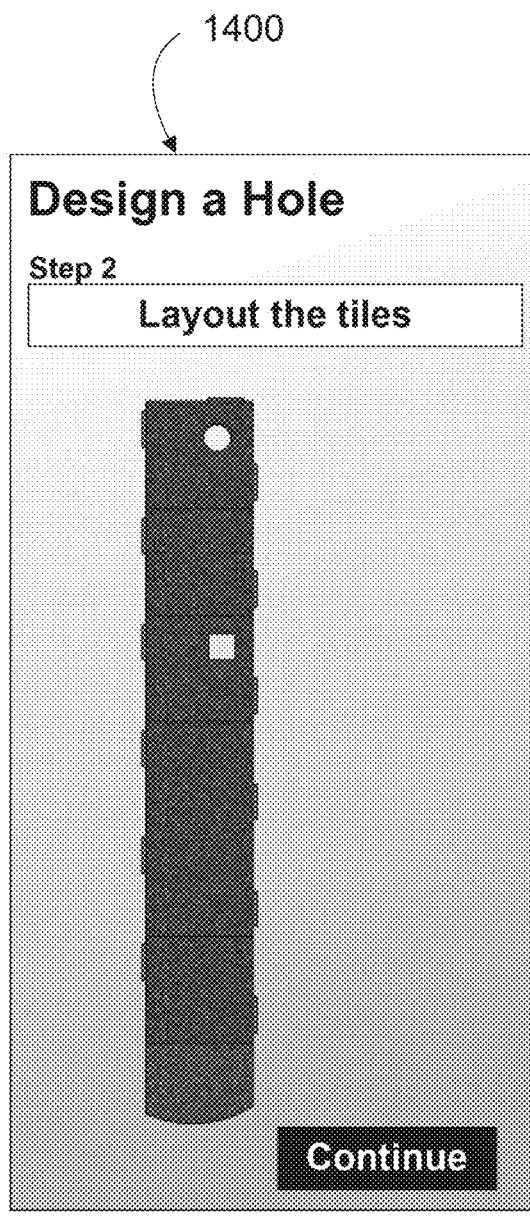
FIG. 14B is the exemplary tile arrangement screen for laying out the new hole, after a player has arranged the tiles to create a playing surface, according to an illustrative embodiment.
Figure 15:
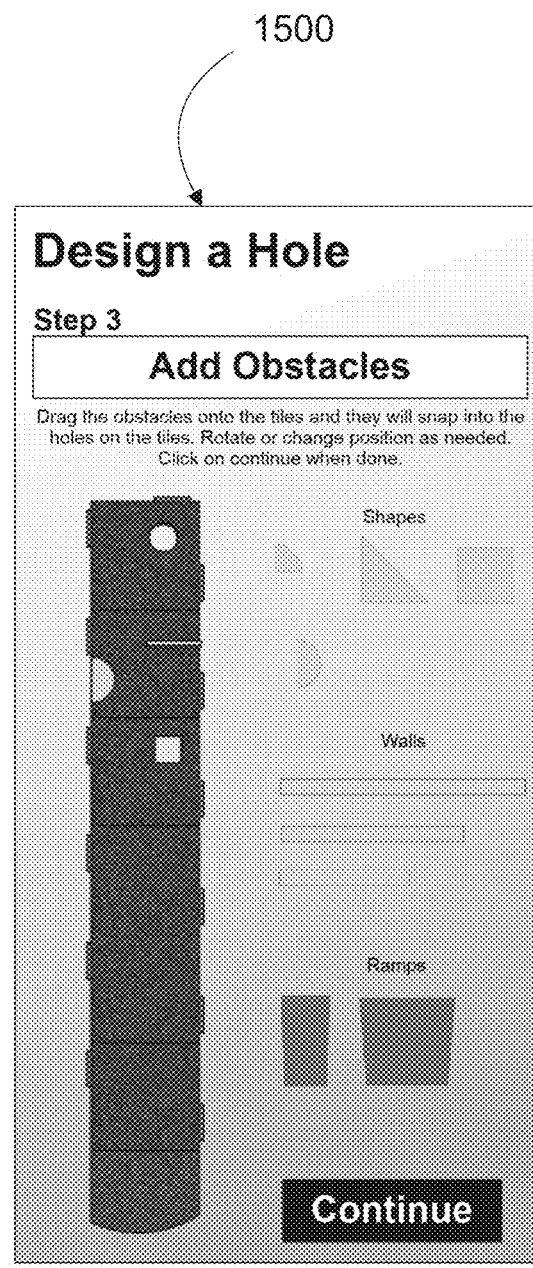
FIG. 15 is an exemplary obstacle screen for adding obstacles and/or other features to the playing field of the new hole, according to an illustrative embodiment.
Figure 16:
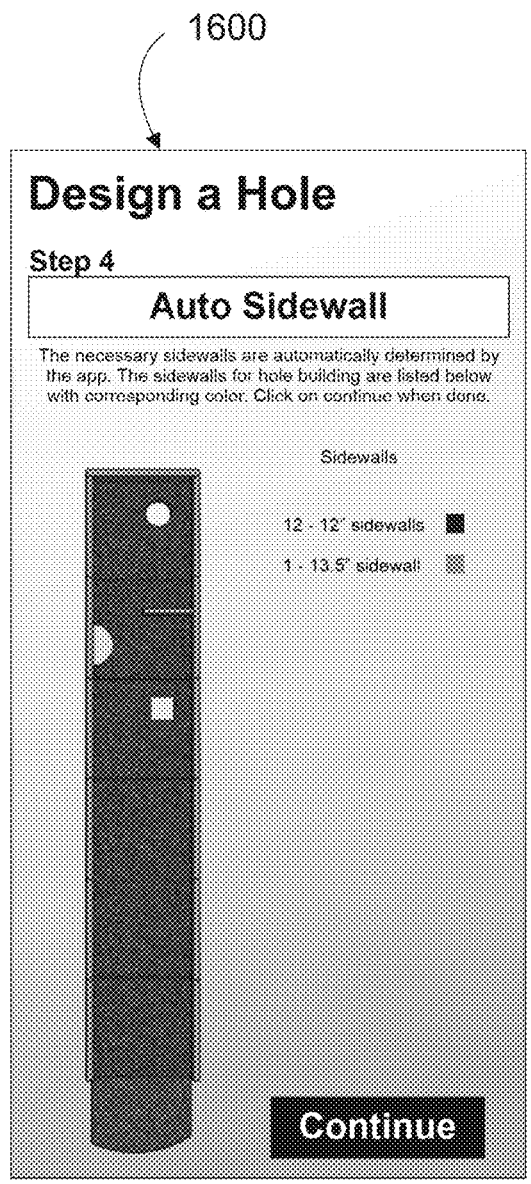
FIG. 16 is an exemplary sidewall screen for adding sidewalls to a new hole, according to an illustrative embodiment.
Figure 17:
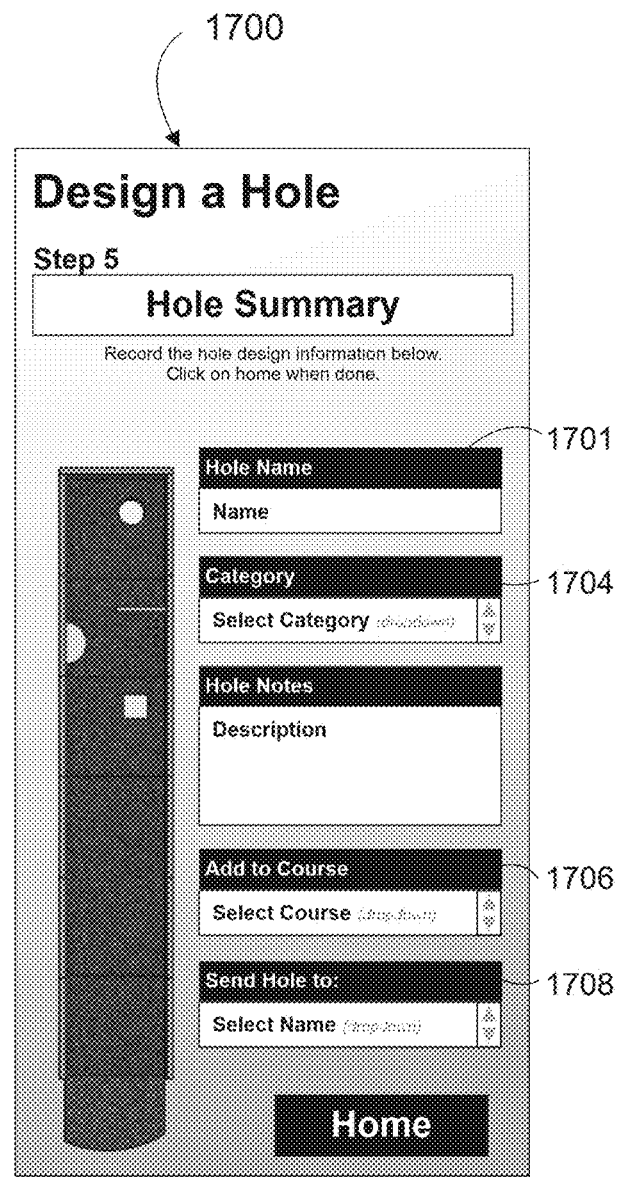
FIG. 17 is an exemplary hole summary screen for a new hole, according to an illustrative embodiment.

FIGS. 14A and 14B show a tile arrangement screen 1400 for laying out a new hole. FIG. 14A shows the all of the tiles that were selected in the previous screen that the player can now arrange. A player can click and drag each tile into place to create a novel playing surface. FIG. 14B shows one possible arrangement of the tiles by a player into a playing surface. FIG. 15 shows an exemplary obstacle screen 1500 for adding obstacles and/or other features to the playing field of the new hole. A player can click and drag one or more obstacles and/or other features into the playing field and add them to obstacle tile(s) and/or feature tile(s). FIG. 16 shows an exemplary sidewall screen 1600 for adding sidewalls to a new hole, according to an illustrative embodiment. The app can automatically determine which sidewall components should be used to enclose the playing field, and can provide a list of sidewall components to guide the player in assembling the newly designed hole. FIG. 17 shows an exemplary hole summary screen 1700 for a new hole, according to an illustrative embodiment. A hole summary screen 1700 can allow a player to name the new hole, categorize the new hole, add the new hole to a course, and/or share the new hole with other players.

A player can design a new hole and share it with other players. The app enables all of the remote players to assemble and play the novel new hole together, even if the players are in different locations. All players can have the option to design and share new holes, and the players can take turns designing new holes and sharing them with each other. The players can create a new course together out of the holes they each created. Players can create a new course spontaneously, with each hole being created and then played before the next hole is created. Players can also create a new course in advance, with players contributing their own new holes or favorite holes, and then the app can combine the holes contributed by each player to create a new course for the players to play together.

Figure 18:
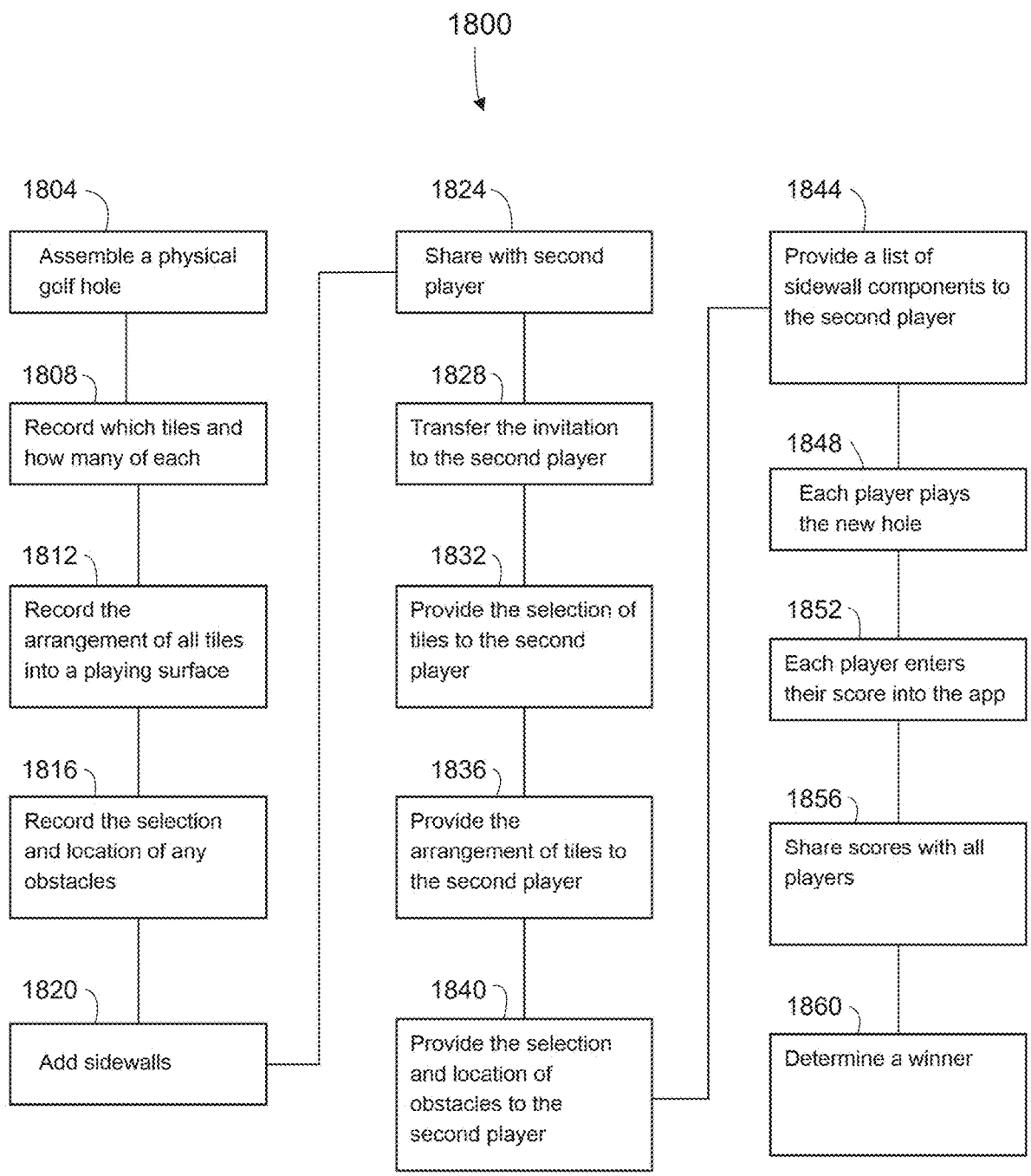
FIG. 18 is a flow chart for designing and sharing a new hole, according to a first illustrative embodiment.

FIG. 18 is a flow chart 1800 for designing and sharing a new hole, according to a first illustrative embodiment. At box 1804, a first player can assemble various physical modular miniature golf hole components to create a new physical golf hole. Assembling components can include arranging a number of tiles to create a playing surface. The first player can select a number of tiles from a variety of possible tiles, and the first player can arrange the selected tiles to create a novel playing surface. A large number of different novel playing surfaces are possible. The first player can optionally add obstacles or other features, so that the playing field can contain novel features. The player can then add sidewalls to form a frame that encloses all or some of the playing field to prevent balls from leaving the playing field.

After completing the assembly of the novel golf hole, at box 1808 the first player can use the tile selection screen in the app to record which tiles and how many of each tiles the first player used to create the new golf hole. At box 1812, the first player can use the tile arrangement screen in the app to record how the first player arranged all of the tiles to create the new playing surface. At box 1816, the first player can use the obstacle screen in the app to record the selection and location of any obstacles the first player incorporated into the new hole. At box 1820, the first player can use the sidewall screen to add sidewalls to the simulation of the new hole that is being developed in the app. At box 1824, the first player can share the new hole with a second player and invite the second player to play the new hole with the first player. The first player also has the options to save the new hole, name the new hole, and/or add the new hole to a course. The first player can also create an entire new course of holes before inviting the second player, and then the first player can then invite the second player to play the entire course designed by the first player after the course has been designed.

At box 1828, the app on the first player's computing device can transfer the invitation to the app on the invited second player's computing device. The app can also transfer all of the information necessary for the second player to construct an identical copy of the hole created by the first player, so that both players will be able to play the same hole, despite being physically remote. At box 1832, the app provides the second player with the selection of tiles, and the second player can select all of the physical tile components from the physical kit. At box 1836, the app can provide the second player with the arrangement of the tiles, as arranged by the first player, and the second player can arrange the tiles in the same arrangement to create a playing surface that is the same as the playing surface created by the first player. At box 1840, the app can provide the second player with the selection and locations of obstacles, if the first player has chosen to use obstacles. If obstacles have been chosen, the second player can select the physical obstacles from the kit, and can place the obstacles into the playing field to create a playing field that is the same as the playing field created by the first player. At box 1844, the app can provide the second player with a list of sidewall components, and can guide the second player in applying the sidewall components to create a frame around the playing field to prevent balls from leaving the playing field. The second player has now created a new golf hole that is the same as the golf hole created by the first player.

At box 1848, the players can each play the new miniature golf hole, with each player using a putter and a golf ball to play the hole, as is known in the art of miniature golf. At 1852, each player can enter their score into the app. At 1856, the app on the first player's computing device and the app on the second player's computing device can share the score information, so that both players can see all of the scores. At 1860, the apps can determine which player has the lowest score, and can declare the player with the lowest score to be the winner of the hole. For the sake of simplicity, only two players have been described herein, however, it should be clear that four or more players can play together, and the four or more players can be at multiple physical locations, including up to, or more than, four physical locations.

Figure 19:
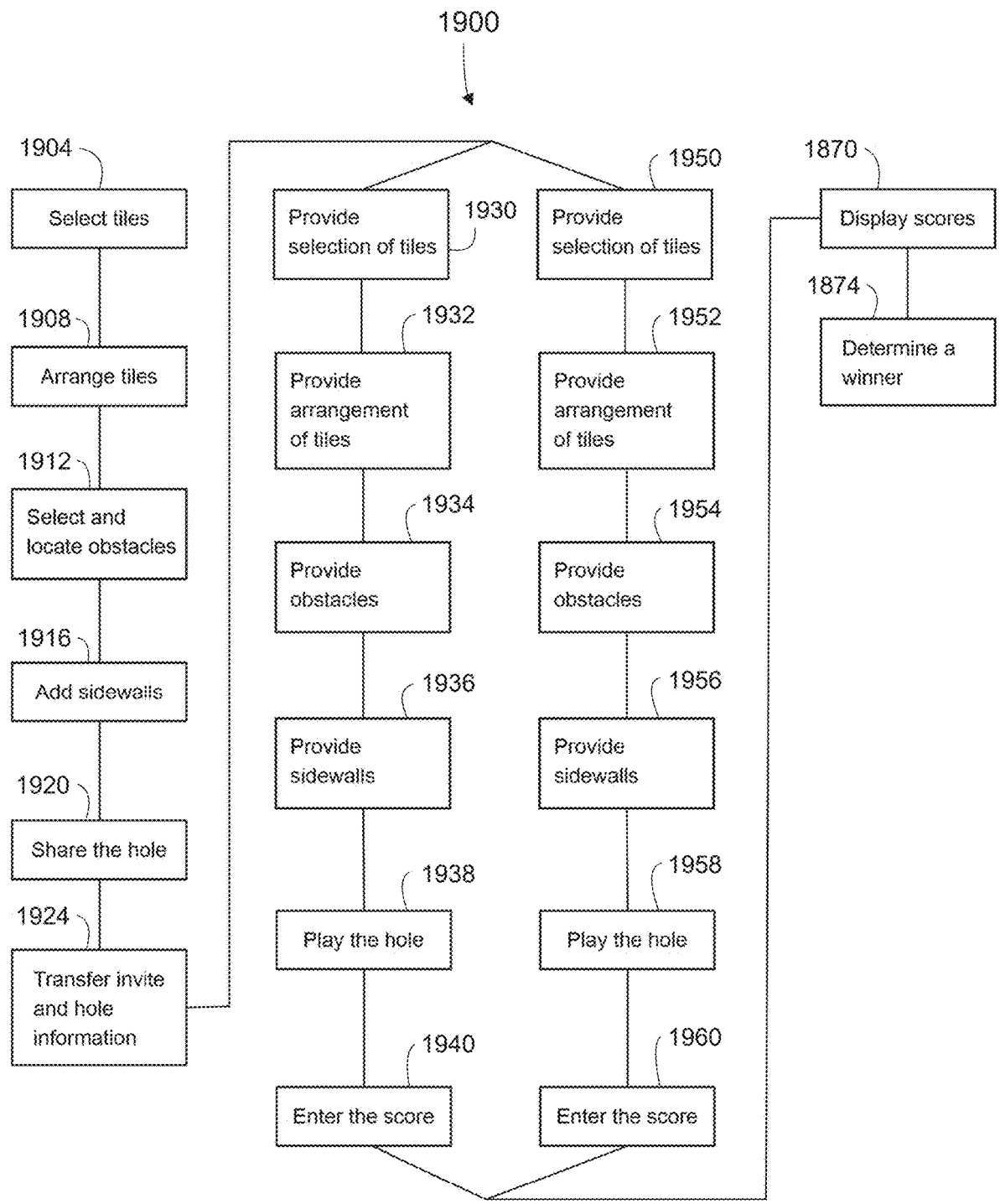
FIG. 19 is a flow chart for designing and sharing a new hole, according to a second illustrative embodiment.

FIG. 19 is a flow chart 1900 for designing and sharing a new hole, according to a second illustrative embodiment. A first player can use an app on a computing device to create a novel golf hole and share the hole with a second player. The first player and the second player can then assemble identical copies of the new golf hole, even if the first player and the second player are in different physical locations. The first player and second player can each play the golf game on their own golf hole, and then they can enter scores into the app and compare scores for the same hole. At box 1904, a first player can use a tile selection screen in the app to select which tiles, and how many of each tiles will be used to create a new golf hole. At box 1908, the first player can use a tile arrangement screen in the app to arrange the tiles to form a playing surface in the app. The playing surface can start with a tee off tile and can include a cup tile. At box 1912, the first player can use an obstacle screen in the app to optionally select any obstacles and/or other features the first player wants to incorporate into the playing field of the new hole. The first player can use the obstacle screen to place the obstacles and/or other features in selected location (s) in the playing field. At box 1916, the first player can use the sidewall screen to add sidewalls to the simulation of the new hole that the first player is developing in the app. At box 1920, the first player can share the new hole with a second player and invite the second player to play the new hole with the first player. The first player also has the options to save the new hole, name the new hole, and/or add the new hole to a course. The first player can also create an entire new course of holes before inviting the second player, and then the first player can then invite the second player to play the entire course designed by the first player after the course has been designed. At box 1924, the app on the first player's computing device can transfer the invitation to the app on the invited second player's computing device. The app can also transfer all of the information necessary for the second player to construct an identical copy of the hole created by the first player, so that both players will be able to play the same hole, despite being physically remote.

At box 1930, the app provides the first player with the selection of tiles, and the first player can select all of the physical tile components from the physical kit. At box 1950, the app provides the second player with the selection of tiles, and the second player can select all of the physical tile components from the physical kit. At box 1932, the app can provide the first player with the arrangement of the tiles, and the first player can arrange the tiles to create a playing surface that is the same as the playing surface designed by the first player in the app. At box 1952, the app can provide the second player with the arrangement of the tiles, as arranged by the first player, and the second player can arrange the tiles in the same arrangement to create a playing surface that is the same as the playing surface designed by the first player. At box 1934, the app can provide the first player with the selection and locations of obstacles and/or other features, if the first player chose to add obstacles and/or other features during development. If obstacles and/ or other features have been chosen, the first player can select the physical obstacles and/or other features from the kit, and can place the obstacles and/or other features into the playing field to create a playing field that is the same as the playing field developed by the first player in the app. At box 1954, the app can provide the second player with the selection and locations of obstacles and/or other features, if the first player chose to add obstacles and/or other features during development. If obstacles and/or other features have been chosen, the second player can select the physical obstacles and/or other features from the kit, and can place the obstacles and/or other features into the playing field to create a playing field that is the same as the playing field developed by the first player in the app. At box 1936, the app can provide the first player with a list of sidewall components, and can guide the first player in applying the sidewall components to create a frame around the playing field to prevent balls from leaving the playing field. At box 1956, the app can provide the second player with a list of sidewall components, and can guide the second player in applying the sidewall components to create a frame around the playing field to prevent balls from leaving the playing field. The first player and the second player have now constructed two identical copies of the same novel golf hole designed by the first player. At box 1938, the first player can play the new miniature golf hole, using a putter and golf ball as is known in the art of miniature golf. At box 1958, the second player can play the new miniature golf hole, using a putter and golf ball as is known in the art of miniature golf. At box 1940, the first player can enter the first player's score into the app on the first player's computing device. At box 1960, the second player can enter the second player's score into the app on the second player's computing device.

It should be noted that the first player and the second player can each build the physical golf hole and play the golf hole at the same time, or one player can build and play the hole in one location at one time, and the other player can build and play the hole at a second location at a second time. The players can play the same hole and compete against each other on the same hole, without needing to be in the same physical location or playing at the same time. At box 1970, the app on each player's computing device can display both player's scores. At box 1974, the apps can determine which player has the lowest score, and can declare the player with the lowest score to be the winner of the hole. For the sake of simplicity, only two players have been described herein, however, it should be clear that four or more players can play together, and the four or more players can be at multiple physical locations, including up to, or more than, four physical locations.

Figure 20:
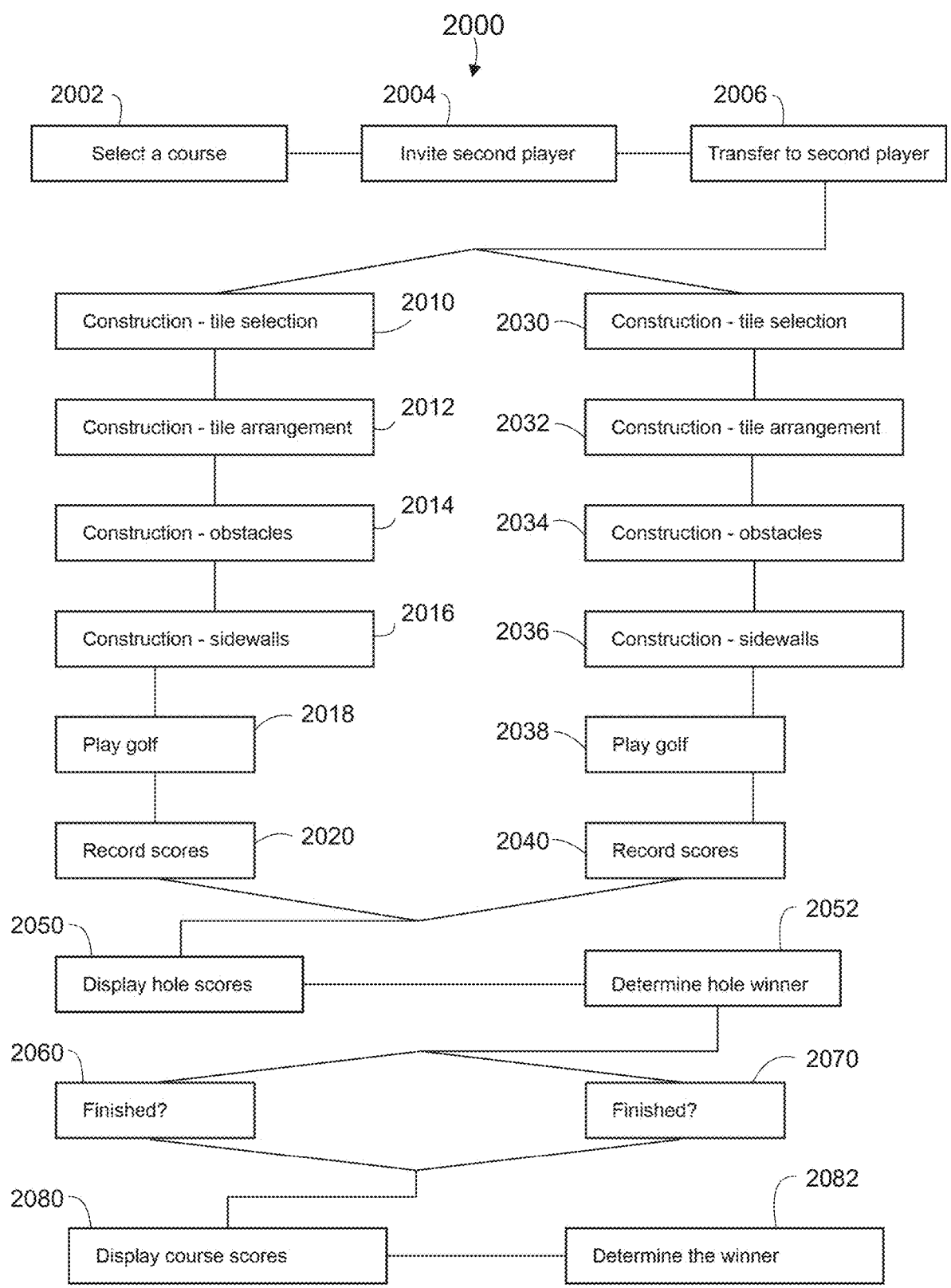
FIG. 20 is a flow chart for playing a game of miniature golf between remote participants, according to an illustrative embodiment.

FIG. 20 is a flow chart 2000 for playing a game of miniature golf between remote participants, according to an illustrative embodiment. At box 2002, a first player can use an app on the first player's computing device to select a miniature golf course. The app can have a library of miniature golf courses to choose from, and the app can allow the first player to access the internet, look at possible courses, and/or download various golf courses. The first player can select the number of holes to be played in the golf course, and can select a course that has at least the selected number of holes. At box 2004, the first player can use the app on the first player's phone to invite a second player to participate in a remote game of miniature golf, using the selected course and selected number of holes. At box 2006, the app can transfer the invitation to the app on the invited second player's computing device. The app can also transfer the number of holes, and all data about the course, including data about each hole, to the app on the second player's phone. At box 2010, the app can begin directing the first player to construct a hole of the course. The app can provide the first player with the selection of tiles, including which tiles and the number of each tiles, and the first player can select all of the physical tile components from the physical kit. At box 2030, the app can begin directing the second player to construct the same hole of the same course. The app can provide the second player with the selection of tiles, including which tiles and the number of each tiles, and the second player can select all of the physical tile components from the physical kit. At box 2012, the app can provide the first player with the arrangement of the tiles, and the first player can arrange the tiles to create a playing surface that matches the playing surface instructed by the app. At box 2032, the app can provide the second player with the arrangement of the tiles, and the second player can arrange the tiles in the same arrangement as instructed by the app. The first player and the second player can each create playing surfaces at their respective locations that match the surfaces instructed by the app, and match each other's playing surfaces.

At box 2014, the app can provide the first player with the selection and locations of obstacles and/or other features, if the hole incorporates obstacles and/or other features into the playing field. If obstacles and/or other features are incorporated in the hole, the first player can select the physical obstacles and/or other features from the kit, and can place the obstacles and/or other features into the playing field to create a playing field that is the same as the playing field instructed by the app. At box 2034, the app can provide the second player with the selection and locations of obstacles and/or other features, if the hole incorporates obstacles and/or other features into the playing field. If obstacles and/or other features are incorporated in the hole, the second player can select the physical obstacles and/or other features from the kit, and can place the obstacles and/or other features into the playing field to create a playing field that is the same as the playing field instructed by the app. The first player and the second player can each create playing fields at their respective locations that match the playing fields instructed by the app, and match each other's playing fields.

At box 2016, the app can provide the first player with a list of sidewall components, and can guide the first player in applying the sidewall components to create a frame around the playing field to prevent balls from leaving the playing field. At box 2036, the app can provide the second player with a list of sidewall components, and can guide the second player in applying the sidewall components to create a frame around the playing field to prevent balls from leaving the playing field. The first player and the second player can construct two identical copies of the same novel golf hole. At box 2018, the first player can play the miniature golf hole, using a putter and golf ball as is known in the art of miniature golf. At box 2038, the second player can play the miniature golf hole, using a putter and golf ball as is known in the art of miniature golf. At box 2020, the first player can enter the first player's score into the app on the first player's computing device. At box 2040, the second player can enter the second player's score into the app on the second player's computing device. At box 2050, the app on each player's computing device can display both scores, if both golfers have finished the hole. If both players have finished the hole, at 2052 the app can determine which player has the lowest score for the hole, and can declare the player with the lowest score to be the winner of the hole. It should be noted that the first player and the second player can each build the physical golf hole and play the golf hole at the same time, or one player can build and play the hole in one location at one time, and the other player can build and play the hole at a second location at a second time. The players can play the same hole and compete against each other on the same hole, without needing to be in the same physical location or playing at the same time. If the players are not playing at the same time, a winner for the hole will not be declared until both players have played the hole.

At box 2060, the app on the first player's computing device can determine if the first player has played all of the selected holes for the selected course. If the first player has not yet played all of the holes, the first player can return to box 2010 and proceed with the next hole. If the first player has played all of the holes, the first player can proceed to box 2080. At box 2070, the app on the second player's computing device can determine if the second player has played all of the selected holes for the selected course. If the second player has not yet played all of the holes, the second player can return to box 2030 and proceed with the next hole.

At box 2080, the app on each player's computing device can display all scores, including each player's score for each hole, and each player's total score for the entire course. At box 2082, the app can determine which player has the lowest score for the course, and can declare the player with the lowest score for the course to be the winner of the course. For the sake of simplicity, only two players have been described herein, however, it should be clear that four or more players can play together, and the four or more players can be at multiple physical locations, including up to, or more than, four physical locations.

Figure 21:
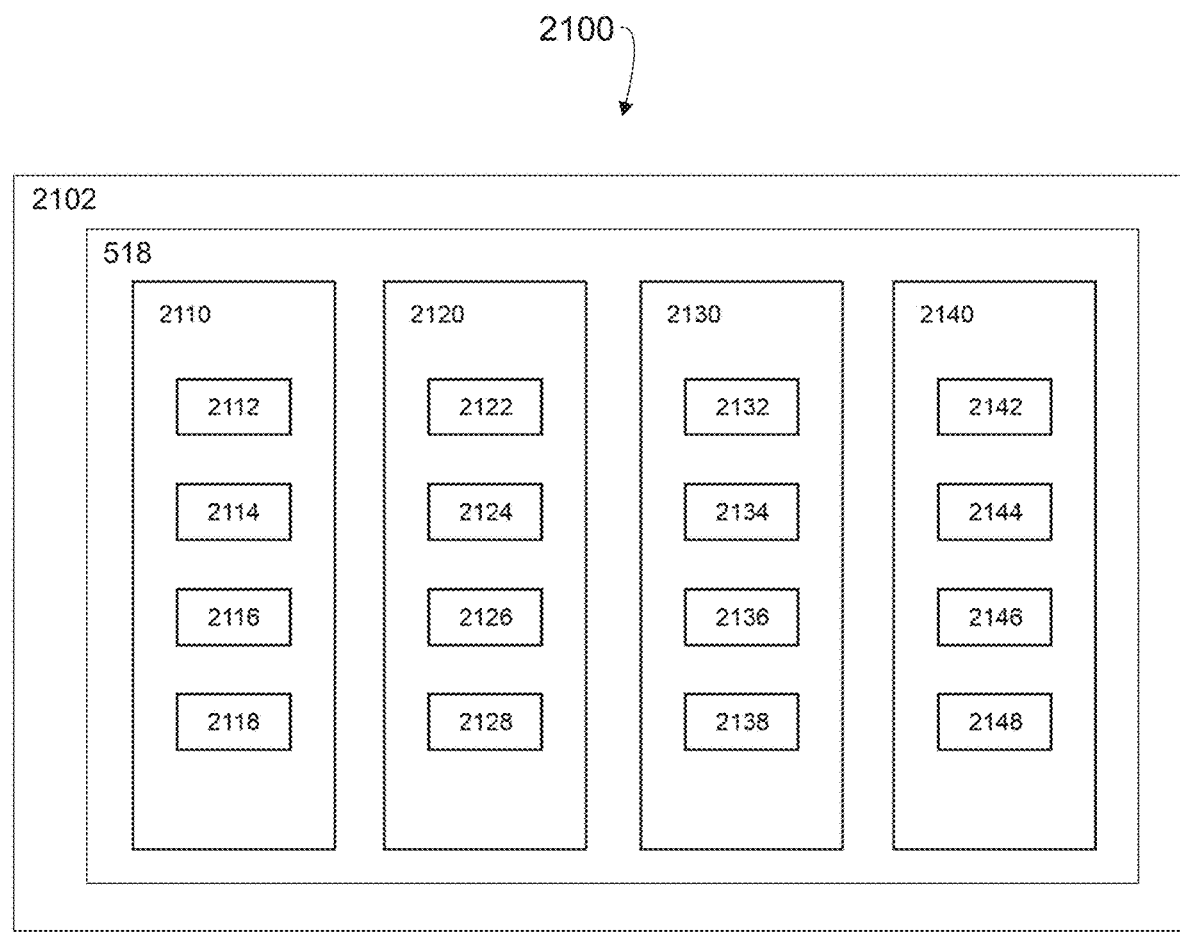
FIG. 21 is a schematic diagram showing an exemplary architecture for a miniature golf building and sharing system, according to an illustrative embodiment.

FIG. 21 is a schematic diagram showing an exemplary architecture 2100 for a miniature golf building and sharing system, according to an illustrative embodiment. An app 518 can run on the processor 2102 of each player's computing device. The app 518 can have input modules 2110, including a tile selection input module 2112 for allowing a user to select which tiles, and how many of each selected tiles, will be part of the golf hole. A tile arrangement input module 2114 allows the user to arrange the selected tiles on a display screen to form a simulated playing surface. Obstacle input module 2116 can allow a user to optionally select obstacles or other features and place them within the playing field of the simulated golf hole being developed. Sidewall formation module 2118 allows the user to add sidewalls to create a frame around the simulated hole. Sidewall formation module 2118 can automatically calculate which sidewall components should go in the various positions around the playing field.

The app 518 can have sharing modules 2120 that can send information to sharing modules on other computing devices over the internet, and can receive information from other sharing modules using the internet. The sharing modules can include an invitation sharing module 2122 that allows a first user to invite other users to participate in a golf game. A hole sharing module 2124 shares information with other users about the construction of a hole, including the selection of tiles, arrangement of tiles, selection and location of obstacles and/or other features, and the identification and arrangement of sidewall components. A course sharing module 2126 shares information with other users about the course, including the number of holes and identification of holes that make up the course. A score sharing module 2128 can share scores with all players, so that each player can see the scores of other players. The score sharing module also allows each player to see who won each hole and who won the course.

The app can have course building modules 2130 that can facilitate each player in constructing identical golf holes in different remote locations. The course building modules can include tile selection output module 2132 that can instruct which physical tiles, and how many of each physical tiles, each remote player should select from the kit containing all physical components. The tile arrangement output module 2134 can instruct each remote player to arrange the tiles to form physical playing surfaces, so that each player arranges the tiles to form playing surfaces identical to playing surfaces arranged other players. The obstacle output module 2136 can direct each player to select obstacles and/or other features and place them within the physical playing field being constructed by each player, so that each player assembles playing fields that are identical to the playing fields assembled by other players. The sidewall output module 2138 can direct each player to select and place sidewalls around the playing field to create the golf hole. The output modules can direct each player to assemble a golf hole that is identical to the golf holes being created by other players.

The game play modules 2140 can facilitate the game being played by remote participants. A hole score input module 2142 allows each player to input their score for a hole. A hole determining module 2144 can determine which player has the lowest score for the hole, and can declare the player with the lowest score the winner of the hole. The score sharing module 2128 can share the score information with all players. The hole identification module 2146 can identify which hole is next, and can share the information about that hole with all players. The course determining module 2148 can determine which player has the lowest score for the course, and can declare the player with the lowest score the winner of the course. The score sharing module can share the course score information with all players.

Figure 22:
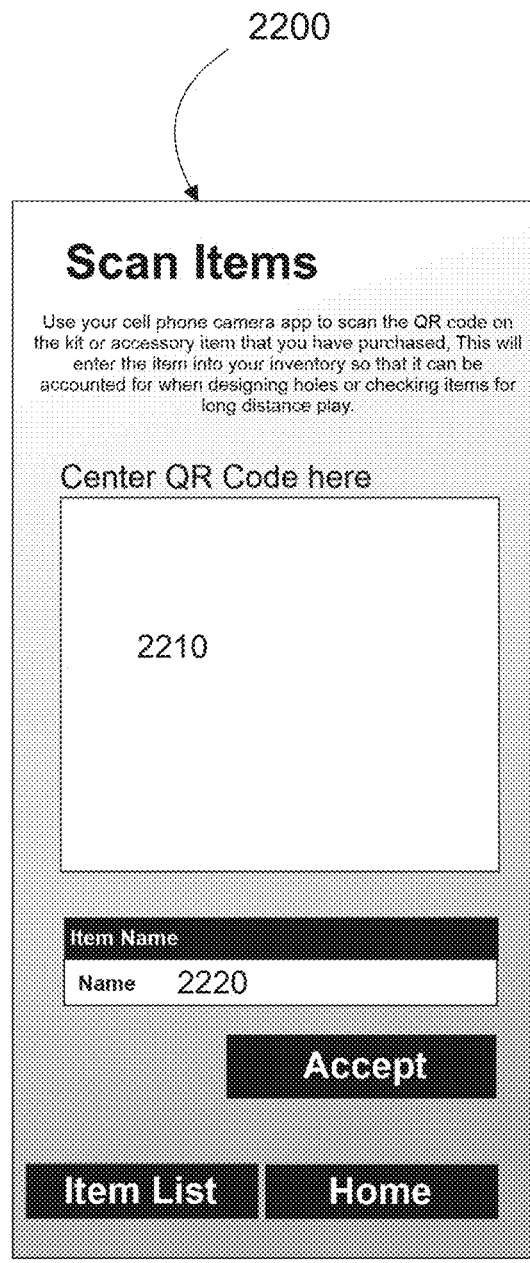
FIG. 22 is an exemplary screen for adding an item to list of items based upon a code on the item that can be scanned by a mobile device camera.

Reference is now made to FIG. 22, which the exemplary app includes a screen 2200 that allows for scanning of a QR, or similar, unique code that can be applied to each item in the kit using an acceptable technique-such as labels, direct print, etc. The code uniquely identifies the item and can be cross-referenced to the inventory contained in the particular kit purchased by the user. In this manner, the user can verify the contents of his/her kit, or any purchased accessories. The code can also be used to assist in the construction of the kit into a completed unit. The display 2200 defines a window 2210 in the code can centered, and thereby imaged for decoding by a mobile device's (e.g. smartphone) camera. The name of the item can be listed and/or input in the box 2220. The display 2200 further includes buttons to accept a new item and call up an item listing. A Home button allows the user to revert to a Home screen after completing tasks on the display 2200. (One purpose of the scanning is to scan in an entire kit at a time. Additionally, when playing a remote game the app will have to check each players inventory to make sure they have the required identical parts to construct the desired holes for the game)

Players can assemble a physical hole using the output modules, then play golf on the physical hole, then enter scores for the hole and see who won the hole using the sharing modules, and then the hole identification module can provide information regarding the next hole to each player's computing device using the sharing modules. Players can then repeat the cycle of using output modules to assist with constructing physical holes, then playing the holes, then entering and comparing scores, and repeating until the players have completed the course and a winner has been determined.

It should be clear that the above-described system and method provides many advantages to the user and suppliers/manufacturers. One advantage is portability, in that (a) the system can be moved anywhere; (b) the basic kit fits in approximately 38 inch by length 15 inch width by 6.5 inch depth tile box; (c) and allows for lightweight package that fits over the shoulder golf bag, enhancing ease of carry on e.g. mass transport. Another advantage is playability in that (a) any age or skill level can play setup and takedown encourage participation and cooperation; (b) hole setup and changing to another hole is straightforward; (c) the hole can be played standing or sitting; and (d) the hole can be played on the floor, on a table or both; (e) the setup of a game can be as simple or as complex as desired by the user complex as you want; and the user may never have to play the same hole/course twice. A further advantage is expandability in that (a) there is no limit to the number of possible hole designs; (b) there are unlimited numbers of tiles, sidewalls, features, obstacles and other accessories available; (c) there is an ability to add as many pieces as the user desires; and (d) holes can be as short or as long as the user desires. Yet another advantage is collectability in that (a) numerous special editions can be manufactured/distributed; (b) individual game pieces can be manufactured/distributed in special/limited editions; (c) themed (e.g. commercial, sports, colleges, etc.) editions; (d) executive, deluxe, an/or exclusive editions can be manufactured/distributed; and (e) custom made one-off kits can be manufactured/distributed.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, in various embodiments, tiles and/or features different than the ones described herein can be used, so long as all players have access to the same tiles or features. Different numbers of players are possible, with players playing at the same or different locations. It should also be clear that more than one player can play at the same location, and those players at the same location can be playing against players at one or more different locations. Also, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for creating and sharing a miniature golf hole comprising:
    a miniature golf hole that is assembled by,
    at a first time, selecting a first selection of physical miniature golf tiles from a first kit containing a first plurality of physical miniature golf tiles;
    assembling the first selection of physical miniature golf tiles, with one or more side edge of each tile in abutment with a side edge of one or more other miniature golf tiles to create a first physical playing surface with the first selection of physical miniature golf tiles arranged together;
    at a second time, disassembling the assembled miniature golf hole according to the first selection and subsequently selecting a second selection of physical miniature golf tiles with an arrangement different from the first selection from the first kit containing a first plurality of physical miniature golf tiles; and
    assembling the second selection of physical miniature golf tiles, with one or more side edge of each tile in abutment with a side edge of one or more other tiles to create a second physical playing surface with the second selection of physical miniature golf tiles arranged together, wherein assembling includes interlocking the physical miniature golf tiles together at each abutted side edge through a blade and slot connection system in which a blade of a side edge of a first abutted tile interlocks with a slot of a second abutted tile so that each of the first physical playing surface and the second physical playing surface form an interlocked portion of the miniature golf hole,
    wherein the physical miniature golf tiles include tiles having a surface simulative of at least one of a tee off location, a sand trap, a water hazard, and a decorative vertical element, and
    wherein the physical miniature golf tiles are each configured with a blade and slot interlocking system along each side edge.

2. A system for creating and sharing a miniature golf hole comprising:
    a miniature golf hole that is assembled by,
    at a first time, selecting a first selection of physical miniature golf tiles from a first kit containing a first plurality of physical miniature golf tiles;
    assembling the first selection of physical miniature golf tiles, with one or more side edge of each tile in abutment with a side edge of one or more other miniature golf tiles to create a first physical playing surface with the first selection of physical miniature golf tiles arranged together;
    at a second time, disassembling the assembled miniature golf hole according to the first selection and subsequently selecting a second selection of physical miniature golf tiles with an arrangement different from the first selection from the first kit containing a first plurality of physical miniature golf tiles; and
    assembling the second selection of physical miniature golf tiles, with one or more side edge of each tile in abutment with a side edge of one or more other tiles to create a second physical playing surface with the second selection of physical miniature golf tiles arranged together, wherein assembling includes interlocking the physical miniature golf tiles together at each abutted side edge through a blade and slot connection system in which a blade of a side edge of a first abutted tile interlocks with a slot of a second abutted tile so that each of the first physical playing surface and the second physical playing surface form an interlocked portion of the miniature golf hole,
    wherein locations of the blade and the slot are the same on each side edge of a tile.

3. The system as set forth in claim 2, wherein locations of each blade and slot are the same for the side edges of each different tile, thereby facilitating any two or more tiles interlocked together in a number of different arrangements.

* * * * *